United States Patent
Powell

(10) Patent No.: US 9,864,119 B2
(45) Date of Patent: Jan. 9, 2018

(54) INFRARED FILTER WITH SCREENED INK AND AN OPTICALLY CLEAR MEDIUM

(71) Applicant: Microsoft Technology Licensing, LLC, Redmond, WA (US)

(72) Inventor: Karlton David Powell, Lake Stevens, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 29 days.

(21) Appl. No.: 14/848,967

(22) Filed: Sep. 9, 2015

(65) Prior Publication Data
US 2017/0068027 A1 Mar. 9, 2017

(51) Int. Cl.
| G02B 5/20 | (2006.01) |
| G02B 5/28 | (2006.01) |
| B29C 41/20 | (2006.01) |
| G02B 5/22 | (2006.01) |
| B29D 11/00 | (2006.01) |

(52) U.S. Cl.
CPC .............. *G02B 5/281* (2013.01); *B29C 41/20* (2013.01); *G02B 5/208* (2013.01); *G02B 5/223* (2013.01); *B29D 11/00634* (2013.01)

(58) Field of Classification Search
CPC ........ G02B 5/281; G02B 5/208; G02B 5/223; G02B 5/20; G02B 5/205; G02B 5/22; B29D 11/00634
USPC ......................... 359/350, 359, 885, 888, 892
See application file for complete search history.

(56) References Cited

U.S. PATENT DOCUMENTS

| 3,926,835 | A | 12/1975 | Tucker |
| 7,513,674 | B1 | 4/2009 | Donahue |
| 8,031,174 | B2 | 10/2011 | Hamblin et al. |
| 8,920,592 | B2 | 12/2014 | Suwa et al. |
| 2003/0152779 | A1 | 8/2003 | Kondo et al. |

(Continued)

FOREIGN PATENT DOCUMENTS

| CN | 103853396 A | 6/2014 |
| CN | 203923086 U | 11/2014 |

(Continued)

OTHER PUBLICATIONS

"Optically Clear Adhesive Tape LUCIACS® CS986 Series", Published on: Nov. 25, 2014, Available at: http://www.nitto.com/jp/en/products/group/optical/structure/011/.

(Continued)

*Primary Examiner* — Arnel C Lavarias
(74) *Attorney, Agent, or Firm* — Ray Quinney & Nebeker, P.C.; Paul N. Taylor; Miia Sula

(57) ABSTRACT

An infrared filter includes a substrate having a front and surface. The infrared filter includes screened ink and an optically clear medium, or dye impregnated medium. The screened ink has a front surface nearest the substrate and a back surface. The screened ink has a first index of refraction. The optically clear medium abuts at least a portion of the back surface of the screened ink. The optically clear medium has a second index of refraction that differs from the first index of refraction of the screened ink by less than a predetermined amount. The dye impregnated medium has a spectral transmission over an infrared wavelength of greater than 70% and a spectral transmission over a visible light wavelength of less than 5%, while at same time maintaining MTF performance of a vision system imaging through the filter. Methods of manufacture are also described.

20 Claims, 15 Drawing Sheets

(56) References Cited

U.S. PATENT DOCUMENTS

| | | |
|---|---|---|
| 2009/0109537 A1 | 4/2009 | Bright et al. |
| 2013/0075595 A1* | 3/2013 | Ruh .................. G01S 7/4814 |
| | | 250/221 |
| 2014/0077690 A1 | 3/2014 | Lee |
| 2014/0125602 A1 | 5/2014 | Chen |
| 2014/0362050 A1 | 12/2014 | Wilson et al. |
| 2016/0054175 A1* | 2/2016 | Jia ..................... G01J 1/4204 |
| | | 250/216 |
| 2016/0209245 A1* | 7/2016 | Ruh .................. H01L 31/125 |

FOREIGN PATENT DOCUMENTS

| | | |
|---|---|---|
| CN | 104360500 A | 2/2015 |
| KR | 20060096838 A | 9/2006 |
| WO | WO2009149032 A1 | 12/2009 |
| WO | 2014210498 A2 | 12/2014 |

OTHER PUBLICATIONS

"Optically Clear Adhesive", Retrieved on: Jun. 16, 2015, Available at: http://www.scapa.com/files/Literature_files/OCA_Brochure.pdf.

"Optically Clear Adhesive Sheet for Film Type Touch Sensor", Published on: Dec. 30, 2013, Available at: http://www.lintec.co.jp/e-dept/english/opteria/products/oca_film.html.

International Search Report and Written Opinion cited in PCT Application No. PCT/US2016/045948, dated Oct. 25, 2016.

International Preliminary Report on Patentability in PCT Application No. PCT/US2016/045948, dated Jul. 11, 2017.

\* cited by examiner

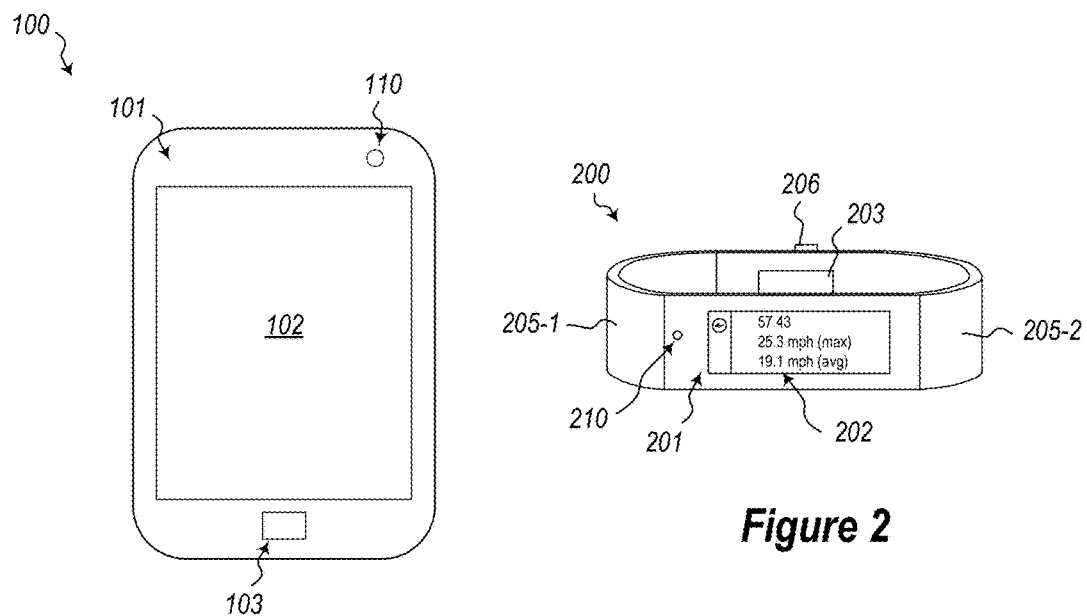
*Figure 1*
*Figure 2*
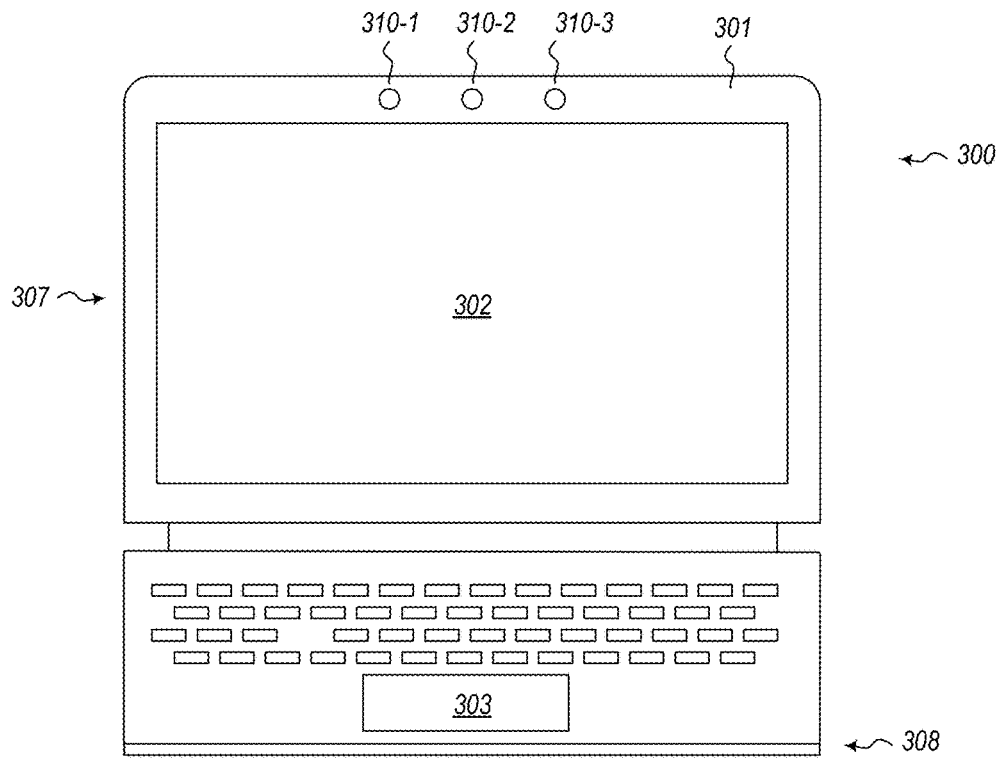
*Figure 3*

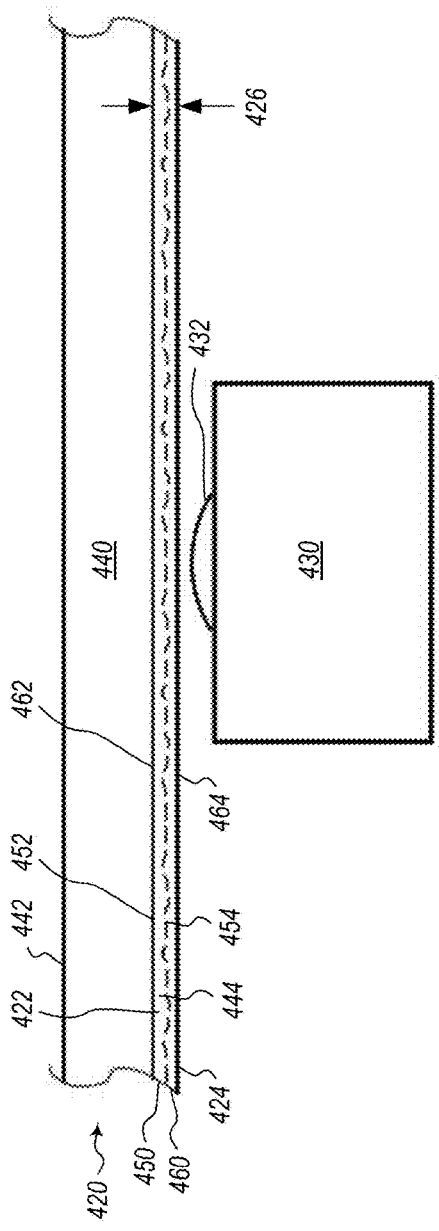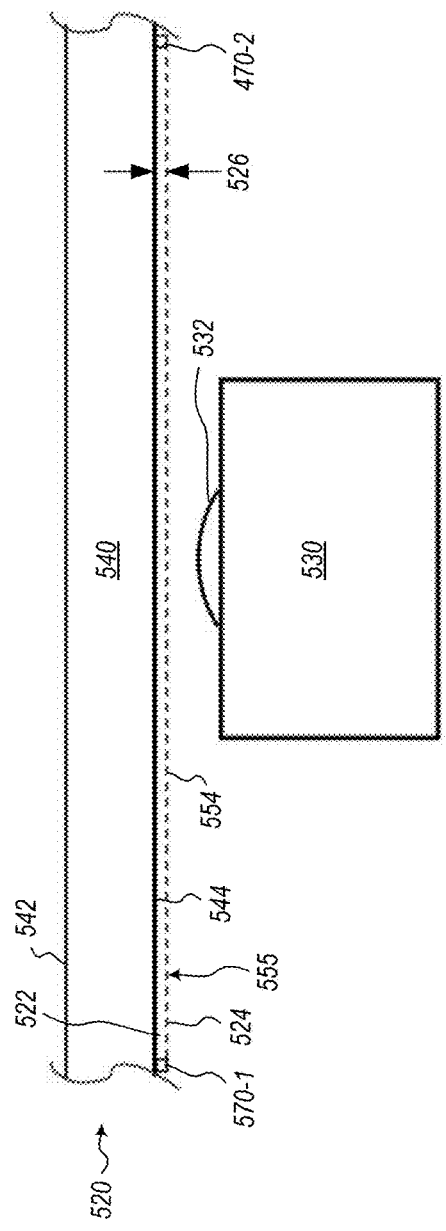

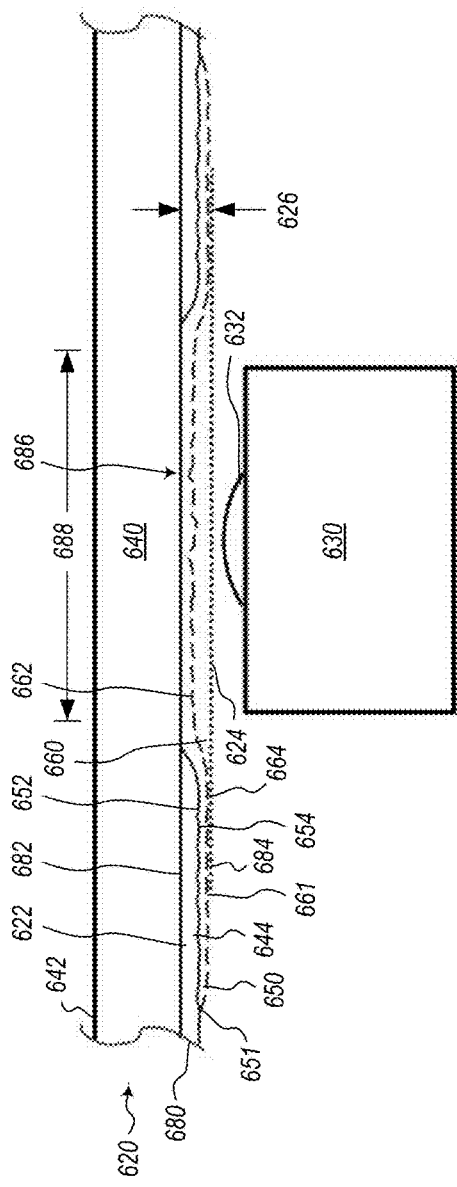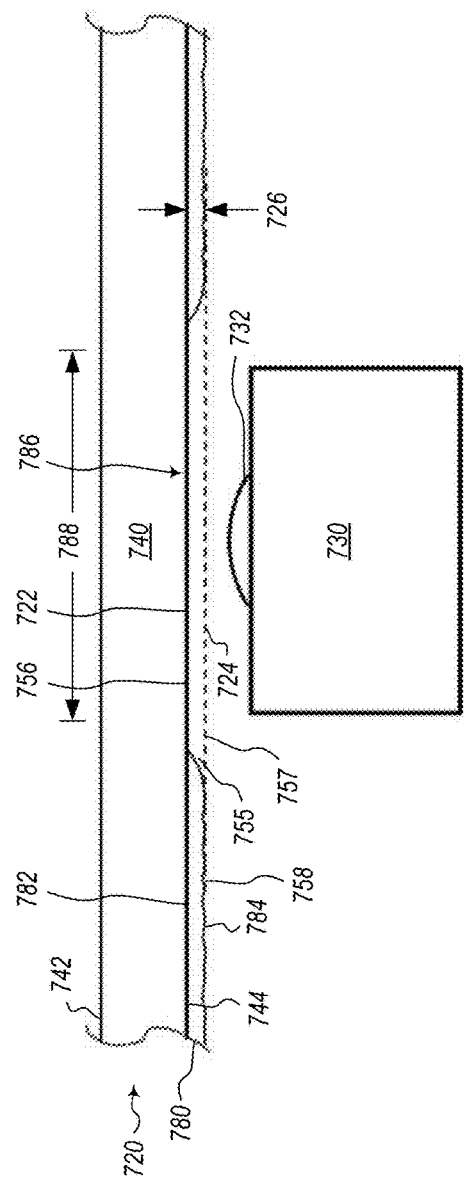

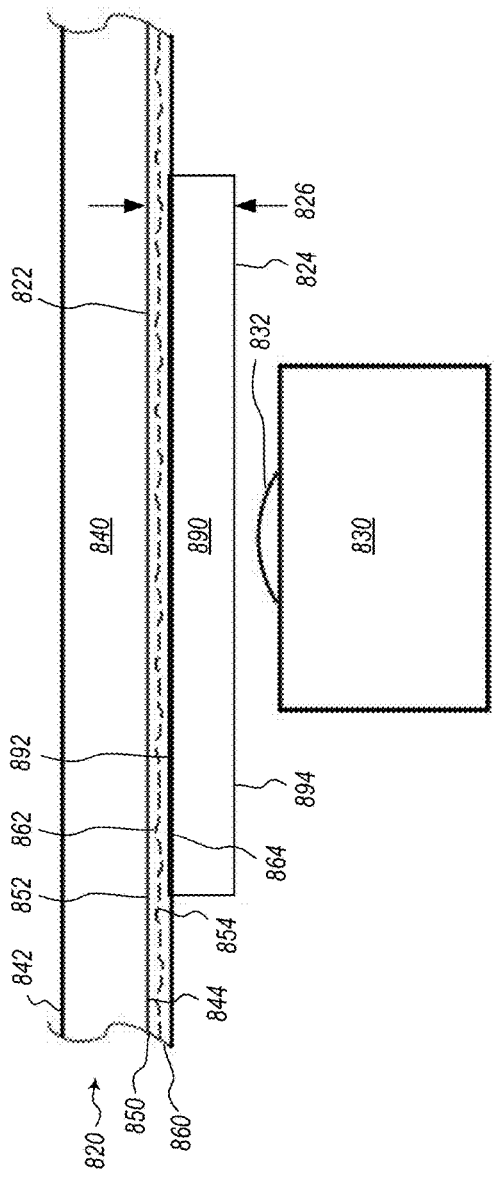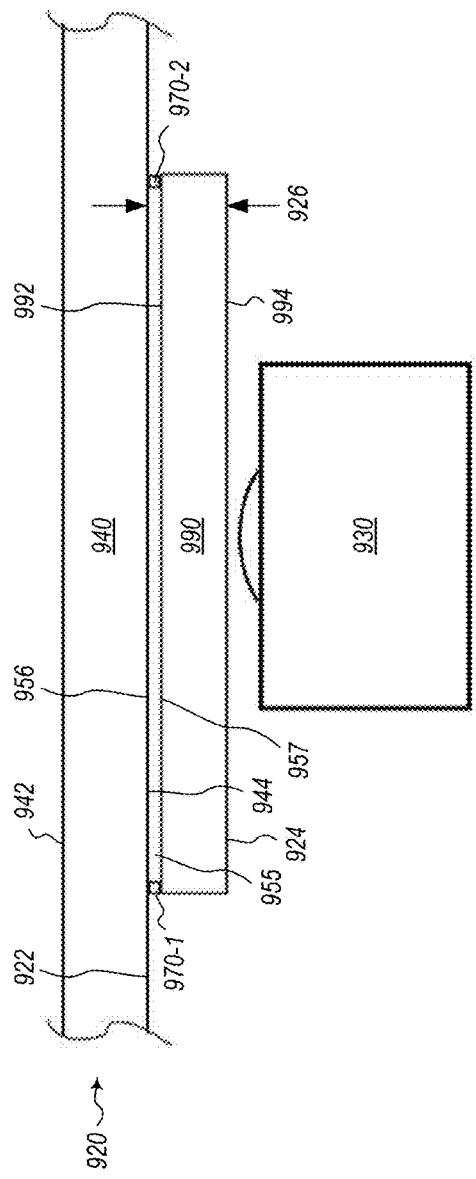

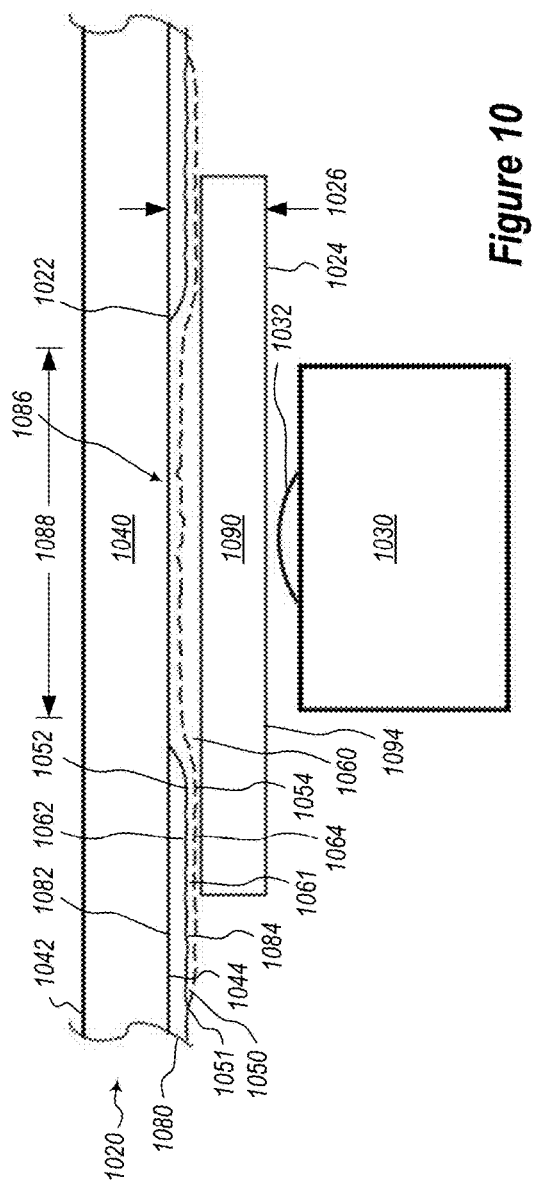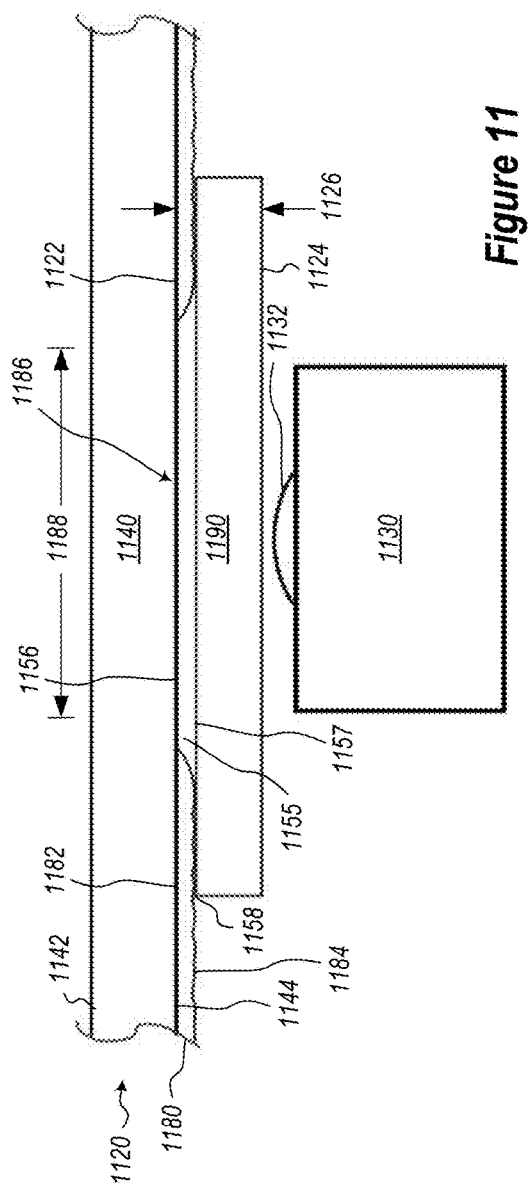

INFRARED FILTER WITH SCREENED INK AND AN OPTICALLY CLEAR MEDIUM

BACKGROUND

Background and Relevant Art

Infrared sensors have been used for a number of functions. One example is for motion detection. Motion may be detected by measuring a change in the amount of infrared light received by an infrared sensor. Infrared sensors have also been used for thermal detection. Detecting the temperature of an object may be accomplished by measuring the infrared emission of the object. Infrared sensors have recently been applied to facial recognition and iris recognition applications.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes an infrared filter. The infrared filter includes a substrate having a front surface and a back surface. The infrared filter includes screened ink having a front surface nearest the substrate and a back surface. The screened ink has a first index of refraction. The infrared filter includes an optically clear medium abutting at least a portion of the back surface of the screened ink and having a second index of refraction that differs from the first index of refraction of the screened ink by less than a predetermined amount.

Another embodiment illustrated herein includes an infrared filter. The infrared filter includes a substrate having a front surface and a back surface. The infrared filter includes a dye impregnated adhesive abutting at least a portion of the back surface of the substrate. The applied dye impregnated adhesive has a front surface nearest the substrate and a back surface. The dye impregnated adhesive has a spectral transmission over an infrared wavelength of greater than 70% and a spectral transmission over a visible light wavelength of less than 10%.

A further embodiment illustrated herein includes a method of manufacturing an infrared filter. The method includes applying a screened ink having a first index of refraction to a back surface of a substrate. An optically clear medium is applied to a back surface of the screened ink. The optically clear medium has a second index of refraction. The first index of refraction and the second index of refraction have a difference of less than a predetermined amount. A mold is applied to a back surface of the optically clear medium. The optically clear medium is cured. The mold is removed from the back surface of the optically clear medium.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1 is a conceptual drawing of an embodiment of a mobile device;

FIG. 2 is a conceptual drawing of an embodiment of a wearable device;

FIG. 3 is a conceptual drawing of an embodiment of a computing device;

FIG. 4 is a cross-sectional view of an embodiment of an infrared filter with an infrared camera module;

FIG. 5 is a cross-sectional view of another embodiment of an infrared filter with an infrared camera module;

FIG. 6 is a cross-sectional view of a further embodiment of an infrared filter with an infrared camera module;

FIG. 7 is a cross-sectional view of a still further embodiment of an infrared filter with an infrared camera module;

FIG. 8 is a cross-sectional view of an embodiment of an infrared filter having an inner substrate and an outer substrate with an infrared camera module;

FIG. 9 is a cross-sectional view of another embodiment of an infrared filter having an inner substrate and an outer substrate with an infrared camera module;

FIG. 10 is a cross-sectional view of a further embodiment of an infrared filter having an inner substrate and an outer substrate with an infrared camera module;

FIG. 11 is a cross-sectional view of a still further embodiment of an infrared filter having an inner substrate and an outer substrate with an infrared camera module;

DETAILED DESCRIPTION

Figure 12:
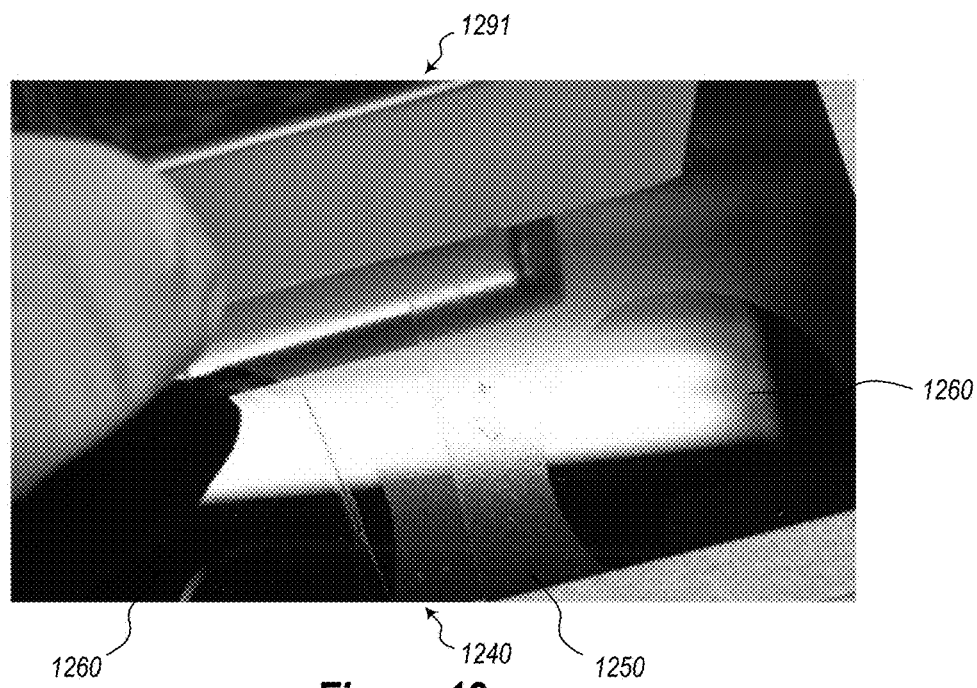
FIG. 12 is a photograph of an embodiment of an infrared filter.

This disclosure generally relates to devices, systems, and methods for filtering infrared light. More particularly, this disclosure generally relates to infrared filters with screened ink and an optically clear medium and infrared filters with a dye impregnated adhesive and methods of manufacturing the same.

For electronic devices making use of infrared vision systems including iris recognition, face recognition, and fingerprint recognition for authentication purposes, it is often desirable to hide such systems from view of a user, as such optics may be reflective in visible light and may be distracting to the user. These vision systems may be placed hidden behind screen printed masking, such as borders of displays, by making use of infrared transmissive/visible blocking ink within mask aperture regions, but screen printing alone typically exhibits a bumpy surface finish, often due to ink viscosity and use of a wire mesh screen, which can cause loss of resolve or an impact on the modulation transfer function (MTF) of a vision system which is placed to image through such an infrared filter. Thicker, double-pass or multiple pass ink screening may be used to improve hiding by achieving more attenuation of visible light, but such layering often further increases surface roughness, which further impacts vision system MTF. By making use of non-volume scattering dye-based infrared transmissive/visible blocking ink, optically transparent index matching filler medium, and forming a specularly flat inner surface, in some embodiments, such infrared vision systems may be hidden from view while supporting MTF requirements of various applications, and be efficient and thin in form factor which is especially important for mobile devices.

In at least one embodiment, a surface having roughness (e.g., being bumpy) adversely impacting MTF performance for a desired application to a predetermined level of a screened ink filter may be made specularly smooth and/or flat by filling in surface irregularities and height variations (e.g., bumpiness, peaks and troughs, protrusions, and dimples) with index-matching media over a desired surface area. As such, any substantially index-matched media which may be formed flat may be used to fill in the surface irregularities. In this embodiment, the ink containing the wavelength selective filter effect should be a non-scattering media, such as dye (e.g., not exhibit volume or bulk scattering). As used herein, the term "visible light" includes wavelengths of light from 400 nm to 700 nm. Another range of visible light includes wavelengths of light from 420 nm to 680 nm. As used herein, the term "infrared light" includes wavelengths of light from 700 nm to 1 µm. Ranges of infrared light to be transmitted according to at least one embodiment herein includes 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1000 nm, or any values therebetween. For example, ranges of infrared light to be transmitted according to at least one embodiment herein may include wavelengths in the range of 810 nm±40 nm, thus between 770 nm and 850 nm, wavelengths in the range of 850 nm±40 nm, thus between 810 nm and 890 nm, and/or wavelengths in the range of 940 nm±45 nm, thus between 895 nm and 985 nm. The infrared light ranges to be transmitted according to at least one embodiment herein may include a central wavelength having a centroid at any wavelength between 700 nm and 1000. The infrared light to be transmitted according to at least one embodiment herein may have a full width at half maximum of FWHM=38 nm. Embodiments including IR LEDs may include transmitting a light source full width at half maximum in range of FWHM=26 nm to FWHM=40 nm, while embodiments including IR lasers may include transmitting a light source full width at half maximum in range of FWHM=2 nm to FWHM=10 nm.

Referring now to FIG. 1, a conceptual drawing of an embodiment of a mobile device 100 is shown. The mobile device 100 (e.g., a smart phone and/or tablet running Windows 10 Mobile available from Microsoft Corporation of Redmond, Wash.) may include a cover glass 101. The cover glass 101 may protect various internal components of the mobile device 100. For example, a processor, memory, battery, transceiver, other internal components, or combinations thereof may be housed behind the cover glass 101. The cover glass 101 may be formed of glass, hardened glass (such as Corning Gorilla® glass), plastic (such as acrylic, polycarbonate or polyester (PET)), hard-coated plastic, other materials, or combinations thereof. In another example, the cover glass 101 may protect a camera module as described below.

The cover glass 101 may protect (e.g., cover) a display 102. The display 102 may display various pieces of information to a user via, for example, a graphical user interface (e.g., a graphical user interface provided with Windows 10 Mobile available from Microsoft Corporation of Redmond, Wash.).

The cover glass 101 may include an input 103. The input 103 may communicate with the mobile device 100 to control what is displayed on the display 102. For example, the input 103 may be a start button (e.g., a start button on a smart phone and/or tablet running Windows 10 Mobile available from Microsoft Corporation of Redmond, Wash.). In some embodiments, the display 102 may also act as an input. For example, the display 102 may include touch sensors that facilitate user input with the mobile device 100.

The cover glass 101 may have portions that are clear (e.g., transmit visible light) and portions that are opaque to a viewer's eye or user's eye (e.g., limit the transmission of visible light). For example, the portions of the cover glass 101 that are aligned with the display 102 may be optically clear, while the rest of the cover glass may be opaque or appear opaque to a user.

The cover glass 101 may include an aperture 110. In some embodiments, the aperture 110 does not extend through the cover glass 101, but rather is an aperture through an opaque portion of the cover glass 101, as by patterned masking. For example, for a camera module that is used to detect visible light, aperture 110 may be optically clear for visible light (e.g., may transmit visible light through the aperture 110). In another example, for a camera module that is used to detect infrared light, the aperture 110 may be optically clear for infrared light (e.g., may transmit infrared light through the aperture 110). In other embodiments, the aperture 110 may extend through the cover glass 101. In embodiments where the aperture 110 extends through the cover glass 101, an additional substrate may be provided between the outermost surface of the cover glass 101 and a lens of a camera module.

In some embodiments, it may be desirable for the aperture 110 to be clear for one type of light, but to be opaque for other types of light. For example, where a camera module includes an infrared sensor, it may be desirable for the infrared sensor to be hidden from a user. One reason for this may include that some infrared sensors have a high level of reflectiveness to visible light, which may make the infrared sensor more visible than a typical visible light sensor, as is typical for many antireflection (AR) coatings on lenses optimized for infrared light. In other words, it may be desirable for the aperture 110 to be opaque (e.g., allowing transmission of less than a predetermined amount) for visible light such that a user cannot readily detect the aperture (not visible or having low visibility to viewer or user) while being optically clear (e.g., allowing transmission of more than a predetermined amount) for infrared light such that infrared light may transmit through the aperture 110. Varying degrees of opacity and/or clarity may be selected. For example, a predetermined value for opacity and/or clarity may include a percentage of spectral transmission for a particular wavelength or range of wavelengths, which will be described in more detail below.

FIG. 2 is a conceptual drawing of an embodiment of a wearable device 200. The wearable device 200 is illustrated as a watch-type wearable device (e.g., a Microsoft Band available from Microsoft Corporation of Redmond, Wash.). In other embodiments, the wearable device 200 may be an eyeglass-type wearable device (e.g., a Microsoft Hololens announced Jan. 21, 2015 to be available from Microsoft Corporation of Redmond, Wash.).

The wearable device 200 may include a cover glass 201. The cover glass 201 may be similar to the cover glass 101 described in connection with FIG. 1. The cover glass 201 may protect a display 202 that may display information and/or act as an input (similar to input 103 and/or display 102).

The wearable device 200 may include an input 203. The input 203 may be used to interact with a user. In the present embodiment, the input 203 may be used to measure a user's heart rate. In some embodiments, the input 203 may otherwise interact with a user. The wearable device 200 may include a first strap 205-1 and a second strap 205-2. The first and second straps 205-1, 205-2 may connect together using a clasp 206.

The cover glass 201 may include an aperture 210. The aperture 210 may be similar to the aperture 110 described in connection with FIG. 1. For example, the aperture 210 may be an aperture through an opaque portion of the cover glass 201. For a camera module that is used to detect visible light, aperture 210 may be optically clear for visible light (e.g., may transmit visible light through the aperture 210). For a camera module that is used to detect infrared light, the aperture 210 may be optically clear for infrared light (e.g., may transmit infrared light through the aperture 210). The aperture 210 may be optically clear for one type of light, but opaque for other types of light. The aperture 210 may be opaque (e.g., allowing transmission of less than a predetermined amount) for visible light such that a user cannot readily detect the aperture (not visible or having low visibility to viewer or user) while being optically clear (e.g., allowing transmission of more than a predetermined amount) for infrared light such that infrared light may transmit through the aperture 210.

FIG. 3 is a conceptual drawing of an embodiment of a computing device 300. The computing device 300 may include an input device 303 that may be used to interact with a user. The input device 303 may include a keyboard, mouse, trackpad, other input, or combinations thereof.

The computing device 300 is illustrated as a laptop-type computing device (e.g., a laptop running Windows 10 available from Microsoft Corporation of Redmond, Wash.). In other embodiments, the computing device 300 may be a desktop computing device with an attached monitor (e.g., a desktop running Windows 10 available from Microsoft Corporation of Redmond, Wash.), may be a gaming system with an attached monitor and/or attached peripherals (e.g., a Microsoft Xbox One available from Microsoft Corporation of Redmond, Wash.), or may be another computing device.

The computing device 300 may include a monitor 307. The monitor 307 may be attached to an input device 303. In other embodiments, the monitor 307 may be physically detached, but in electronic communication with the input device 303. The monitor 307 may include a display 302. The display 302 may display information (e.g., in a standard monitor) and/or act as an input (e.g., in a touch screen monitor similar to inputs 103, 203 and/or displays 102, 202).

The monitor 307 may include a cover glass 301. The cover glass 301 may be similar to the cover glasses 101, 201 described in connection with FIGS. 1 and 2. The cover glass 301 may protect the display 302. In some embodiments, the cover glass 301 may be a single, unitary piece (e.g., as shown in FIG. 1). In other embodiments, the cover glass 301 may be separate pieces. For example, the cover glass 301 may have a first piece that covers only the display 302 and a second piece that covers the rest of a surface (e.g., the surface including the display 302) of the monitor 307. In some embodiments, cover glass 301 may cover a portion of the input device 303 and/or peripherals connected to the computing device 300. For example, a portion of the input device 303 may be covered by a piece of cover glass 301. In another example, a portion of a peripheral (e.g., a Kinect available from Microsoft Corporation of Redmond, Wash.) may be covered by a piece of cover glass 301.

The cover glass 301 may include a plurality of apertures 310. In the present embodiment, the cover glass 301 includes three apertures 310-1, 310-2, 310-3. The apertures 310 may be similar to the apertures 110, 210 described in connection with FIGS. 1 and 2. For example, the apertures 310 may be apertures through an opaque portion of the cover glass 301, whether on the monitor 307 or another component connected to the computing device 300. For a camera module that is used to detect visible light, an aperture 310 may be optically clear for visible light (e.g., may transmit visible light through the aperture 310). For a camera module that is used to detect infrared light, an aperture 310 may be optically clear for infrared light (e.g., may transmit infrared light through the aperture 310). An aperture 310 may be optically clear for one type of light, but opaque for other types of light. An aperture 310 may be opaque (e.g., allowing transmission of less a predetermined amount) for visible light such that a user cannot readily detect the aperture while being optically clear (e.g., allowing transmission of more than a predetermined amount) for infrared light such that infrared light may transmit through an aperture 310.

In one example, the first aperture 310-1 is oriented with respect to an infrared sensor, the second aperture 310-2 is oriented with respect to a visible light sensor, and the third aperture 310-3 is oriented with respect to an infrared sensor. The first aperture 310-1 may be clear (e.g., allowing transmission of more than a predetermined amount) for infrared light and opaque (e.g., allowing transmission of less than a predetermined amount) for visible light. In this example, the first aperture 310-1 would be invisible to a typical user while efficiently transmitting infrared light to the infrared sensor. The second aperture 310-2 may be optically clear for visible light (and may be clear or opaque for infrared light). In this example, the second aperture 310-2 would be visible to a user (and if opaque to infrared light, would transmit less than a predetermined amount of infrared light). The third aperture 310-3 may be optically clear for infrared light and clear for visible light. In this example, the third aperture 310-3 would be visible to a user and as the third aperture 310-3 is aligned with an infrared sensor, the third aperture 310-3 may be even more visible than the second aperture 310-2, as the infrared sensor may reflect visible light.

In a further example, more or fewer apertures 310 may be used with variations of opaque and clear portions of varying opacity for visible and/or infrared light. Similarly, more or fewer apertures may be used with variations of opaque and clear portions of varying opacity for visible and/or infrared light in connection with the devices of FIGS. 1 and 2.

FIG. 4 is a cross-sectional view of an embodiment of an infrared filter 420 with an infrared camera module 430. The infrared filter 420 may include an outermost surface 422 and an innermost surface 424.

The infrared camera module 430 may include an infrared sensor (not shown) and a lens 432. Although the infrared filter 420 is shown with a single infrared camera module 430, multiple infrared and/or other camera modules may be used.

The infrared filter 420 may be positioned relative to the lens 432, such that the infrared camera module 430 is capable of receiving a desired amount of light. For example, the lens 432 may be positioned in a range of 100 µm from the innermost surface 424 of the infrared filter 420. The position of the lens 432 may be determined by, for example, a desired field of view for the camera module 430. In some embodiments, the lens 432 may be positioned away from the innermost surface 424 of the infrared filter 420 by between 50 µm and 500 µm, or any value therebetween.

The infrared filter 420 may include a substrate 440. The substrate 440 may include a front surface 442 and a back surface 444. The substrate 440 may be sized to cover the lens 432 of the camera module 430.

The infrared filter 420 may include a screened ink 450. The screened ink 450 may include a front surface 452 and a back surface 454. In the present embodiment, the front surface 452 of the screened ink 450 may be applied to the back surface 444 of the substrate 440. The front surface 452 of the screened ink 450 may abut (e.g., directly contact) the back surface 444 of the substrate 440. In some embodiments, the surface of substrate 440 may include pretreatments of an adhesion promoter (not shown) to promote wetting and adhesion of the screened ink layer 450 to the substrate 440.

Applying screened ink to a surface may include using a mesh of a desired size to apply the screened ink to the surface. Often screened ink may exhibit a phenomenon called "orange peel" or ripple across at least a portion of its back surface (e.g., back surface 454 of screened ink 450). For example, as shown in FIG. 4, the back surface 454 of the screened ink 450 exhibits an uneven surface profile. In other words, the back surface 454 of the screened ink 450 may have a surface roughness ($R_a$) above a desired value. This surface roughness may cause scatter of at least a portion of the light transmitted through the infrared filter to the imaging system, thus may impact the imaging system performance in terms of contrast and resolve. Typical screened ink may exhibit a surface roughness ($R_a$) in the range of 0.25 µm to 0.8 µm, and multiple passes of screening typically increases surface roughness. Face recognition applications may require $R_a$ less than 0.24 µm, while iris recognition applications may require $R_a$ less than 0.1 µm, however the average spacing of scatter centers is also a factor beyond surface roughness alone. In theory, the surface roughness of the screened ink may be higher than the provided values. The use of screened ink may reduce the overall cost of at least one embodiment of an infrared filter described herein.

As infrared light is to transmit through the infrared filter 420 from the outermost surface 422 through the innermost surface 424, an uneven surface may affect the modulation transfer function (MTF) of the imaging system through infrared filter 420, which as a machine vision system now includes the resolving performance of both the camera module 430 and infrared filter 420. The MTF of an optical imaging system describes the spatial frequency response of a component of an imaging system or the entire imaging system. If the MTF of the infrared filter 420 and infrared camera module 430 are too low, the infrared camera module 430 may not be capable of performing its desired function. For example, an infrared camera module 430 may be used for face recognition, iris recognition, or fingerprint recognition, other functions, or combinations thereof. As an example, for iris recognition, an imaging system may require an MTF of greater than 40% modulation at an object space spatial frequency of 2 cycles per mm at object, while face recognition may require an MTF of greater than 50% modulation at an object space spatial frequency of 0.11 cycles per mm at object.

To reduce the roughness (and thereby improve the MTF) of the screened ink 450, a layer of optically clear medium 460 (e.g., an optically clear adhesive, a two-part epoxy, a thermally deposited cooled and/or cured resin, or dried ink base) may be applied. The optically clear medium 460 may include a front surface 462 and a back surface 464. In the present embodiment, the front surface 462 of the optically clear medium 460 may be applied to the back surface 454 of the screened ink 450. The front surface 462 of the optically clear medium 460 may abut (e.g., directly contact) the back surface 454 of the screened ink 450. The optically clear medium 460 may be applied (e.g., "flat cast") according to at least one embodiment of a method of manufacture as described herein.

The front surface 462 of the optically clear medium 460 may at least partially fill in and/or smooth out gaps formed by the back surface 454 of the screened ink. Examples of the effects of optically clear medium being "flat cast" over screened ink on surface roughness ($R_a$) are provided below (e.g., FIGS. 16-29). In some embodiments, the back surface 464 of the optically clear medium 460 may be flat (e.g., specularly smooth and flat). In other embodiments, the back surface 464 of the optically clear medium 460 may have some amount of surface roughness. For example, the back surface 464 may have a surface roughness between 0 μm or 0.06 μm and 0.24 or therebetween.

The screened ink 450 may have a first index of refraction and the optically clear medium 460 may have a second index of refraction. Differences in index of refraction (Δn) affect the MTF of the system. Therefore, Δn should be small to minimize the effect on the MTF.

The front surface 452 of the screened ink 450, in the present embodiment, is the same as the outermost surface 422 of the infrared filter 420 and the back surface 464 of the optically clear medium 460 is the same as the innermost surface 424 of the infrared filter 420. In other embodiments, other surfaces may be the outermost surface 422 and/or the innermost surface 424 of the infrared filter 420.

The infrared filter 420 may have a maximum thickness 426. The maximum thickness 426 may be measured through the thickness of the infrared filter 420 from the outermost surface 422 of the infrared filter 420 (excluding the substrate 440) to the innermost surface 424 of the infrared filter 420. In other words, the maximum thickness 426 may be measured from the front surface 452 of the screened ink 450 to the back surface 464 of the optically clear medium 460. Measuring the maximum thickness 426 without the substrate 440 may allow the infrared filter 420 to be used a substrate 440 of any thickness.

In some embodiments, it may be desirable to minimize the maximum thickness of the infrared filter 420. For example, for mobile devices, such as mobile device 100, users tend to prefer more thin devices.

The substrate 440 may be formed of glass, hardened glass (such as Corning Gorilla® glass), plastic (such as acrylic, polycarbonate or polyester (PET)), hard-coated plastic, other materials, or combinations thereof. The screened ink 450 may include an IR-Transparent/Visible-Block ink having greater than 89% transmission for IR source range, Teikoku IRK-HF40908 ink, other inks, or combinations thereof. The screened ink 450 is shown in FIG. 4 as a single layer (e.g., a single pass) of ink. In other embodiments, more than one layer (e.g., multiple passes) of ink may be applied. However, multiple passes of ink appear to increase the surface roughness and/or scatter for the back surface of the screened ink. The optically clear medium 460 may include Norland Optical Adhesive 81 (NOA81) which exhibits a refractive index near n=1.56 for green light, or other acrylic based UV-cure adhesives which are offered in a broad range of refractive indices from n=1.33 to n=1.7 from Norland Products, Dymax, Addison Clear Wave, My Polymers, Dupont, Master Bond, or other low outgassing adhesives. Choice of medium may enable optimization of index matching to reduce impact on MTF, and also adhesion to the choice of substrate 440. Note that while UV-cure adhesives are convenient and may be efficiently applied and cured, other adhesives including two-part epoxies and curable resins may also be used to achieve similar index-matching effect.

The infrared filter 420 may have a spectral transmission (e.g., a percentage of the total light that is transmitted through the filter) for visible and infrared light. The spectral transmission may be chosen based on the spectral transmission of the components of the infrared filter 420. For example, the screened ink 450 may have a desired spectral transmission for visible and/or infrared light.

As illustrated in FIG. 4, the screened ink 450 may cover the entire back surface 444 of the substrate 440. For example, the screened ink 450 may cover an entire back surface of a cover glass (e.g., cover glass 101, 201, 301 shown in FIGS. 1-3). In this example, a desired amount of visible light may be blocked, while transmitting a desired amount of infrared light. In other embodiments, the screened ink 450 may cover less than the entire back surface 444 of the substrate 440. Also, as illustrated in FIG. 4, the optically clear medium 460 may cover the entire back surface 454 of the screened ink 450. In other embodiments, the optically clear medium 460 may cover less than the entire back surface 454 of the screened ink 450. In another example, the screened ink 450 may cover less than the entire back surface 444 of the substrate 440 and the optically clear medium 460 may cover less than the entire back surface 454 of the screened ink 450, such that a terminal (e.g., outermost) edge of the optically clear medium 460 does not overlap a terminal edge of the screened ink 450 and that terminal edge of the screened ink 450 does not overlap a terminal edge of the substrate 440.

FIG. 5 is a cross-sectional view of another embodiment of an infrared filter 520 with an infrared camera module 530. The infrared filter 520 may be similar to the infrared filter 420 described in connection with FIG. 4. For example, the infrared filter 520 may include an outermost surface 522, an innermost surface 524, a maximum thickness 526, and a substrate 540. The infrared camera module 530 may include an infrared sensor (not shown) and a lens 532.

The substrate 540 may include a front surface 542 and a back surface 544. The substrate 540 may be sized to cover the lens 532 of the camera module 530. The substrate 540 may be substantially the same as the substrate 440 described in connection with FIG. 4.

One way in which the infrared filter 520 of FIG. 5 differs from the infrared filter 420 of FIG. 4 is by combining the function of the screened ink (e.g., screened ink 450) and the function of the optically clear medium (e.g., optically clear medium 460) into a single dye impregnated medium 555. The dye impregnated medium 555 may include a front surface 556 and a back surface 557.

In the present embodiment, the front surface 556 of the dye impregnated medium 555 may be applied to the back surface 544 of the substrate 540. The front surface 556 of the dye impregnated medium 555 may abut (e.g., directly contact) the back surface 544 of the substrate 540.

The dye impregnated medium 555 may be formed of a UV-cure adhesive having an IR-Transmit/Visible-Block dye, where the dye absorbs a substantial portion of visible light while allowing transmission of a substantial portion of IR light. The dye impregnated medium 555 may have a uniform thickness (e.g., the same thickness across the entire die impregnated medium 555) due to shims 570. As FIG. 5 is illustrated in cross-section, the shims 570 may be two shims 570-1, 570-2. In other embodiments, a single shim 570 may enclose the dye impregnated medium 555. For example, the single shim 570 may be circular, polygonal, or otherwise shaped to surround the dye impregnated medium 555. Shims may be used with the screened ink 450 and/or optically clear medium 460 of the infrared filter 420 shown in FIG. 4. In some embodiments, a mold, such as a silicone mold, may be made which includes the standoff thickness of shims, such that shims are not needed. The thickness of shims or standoffs within mold may be as thin as required in order to maintain concentration required of dye in adhesive in order to maintain desired spectral transmission response curve across visible and infrared wavelengths.

The dye impregnated medium 555 may be applied without a screen. This may facilitate improved surface roughness on the back surface 557 of the dye impregnated medium 555.

In the present embodiment, the front surface 556 of the dye impregnated medium 555 is the same as the outermost surface 522 of the infrared filter 520 and the back surface 557 of the dye impregnated medium 555 is the same as the innermost surface 524 of the infrared filter 520. In other embodiments, other surfaces may be the outermost surface 522 and/or the innermost surface 524 of the infrared filter 520.

The maximum thickness 526 is illustrated as thinner than the maximum thickness 426 shown in FIG. 4. However, the maximum thickness 526 may be thicker than the maximum thickness 426 shown in FIG. 4. The maximum thickness 526 may be measured through the thickness of the infrared filter 520 from the outermost surface 522 of the infrared filter 520 (excluding the substrate 540) to the innermost surface 524 of the infrared filter 520. In other words, the maximum thickness 526 may be measured from the front surface 552 of the dye impregnated medium 555 to the back surface 557 of the dye impregnated medium 555.

As illustrated in FIG. 5, the dye impregnated medium 555 may cover the entire back surface 544 of the substrate 540. For example, the dye impregnated medium 555 may cover an entire back surface of a cover glass (e.g., cover glass 101, 201, 301 shown in FIGS. 1-3). In this example, a desired amount of visible light may be blocked, while transmitting a desired amount of infrared light. In other embodiments, the dye impregnated medium 555 may cover less than the entire back surface 544 of the substrate 540. In another example, the dye impregnated medium 555 may cover less than the entire back surface 544 of the substrate 540, such that a terminal (e.g., outermost) edge of the dye impregnated medium 555 does not overlap a terminal edge of the substrate 540.

FIG. 6 is a cross-sectional view of a further embodiment of an infrared filter 620 with an infrared camera module 630. The infrared filter 620 may be similar to the infrared filters 420, 520 described in connection with FIGS. 4 and 5. For example, the infrared filter 620 may include an outermost surface 622, an innermost surface 624, a maximum thickness 626, and a substrate 640.

The substrate 640 may include a front surface 642 and a back surface 644. The substrate 640 may be sized to cover a lens 632 of the camera module 630. The substrate 640 may be substantially the same as the substrates 440, 540 described in connection with FIGS. 4 and 5.

One way in which the infrared filter 620 of FIG. 6 differs from the infrared filters 420, 520 of FIGS. 4 and 5 is by adding a visible light mask 680. The visible light mask 680 includes a front surface 682 and a back surface 684. The visible light mask 680 may define an aperture 686 through which visible light may transmit. The aperture 686 may be similar to the apertures 110, 210, 310 described in connection with FIGS. 1-3. The aperture 686 may have a major dimension 688 (e.g., a diameter or width). For example, the major dimension 688 may be between 1 mm and 5 mm, or any value therebetween. As FIG. 6 is illustrated in cross-section, the visible light mask 680 may be two visible light masks (e.g., one on the left and one on the right). In other embodiments, a single visible light mask 680 may enclose the aperture 686. For example, the formed aperture 686 may be circular, polygonal, or otherwise shaped.

The infrared filter 620 and the aperture 686 may be positioned relative to the lens 632, such that the infrared camera module 630 is capable of receiving a desired amount of light. For example, the lens 632 may be positioned 100 μm from the innermost surface 624 of the infrared filter 620 with a major dimension 688 of the aperture 686 of 3 mm. In other embodiments, the lens 632 may be positioned away from the innermost surface 624 of the infrared filter 620 by between 50 μm and 500 μm, or any value therebetween.

The infrared filter 620 may include a screened ink 650. The screened ink 650 may include a front surface 652 and a back surface 654. In the present embodiment, the front surface 652 of the screened ink 650 may be applied to a portion of the back surface 644 of the substrate 640 (e.g., within the aperture 686). The front surface 652 of the screened ink 650 may abut (e.g., directly contact) the back surface 644 of the substrate 640 (e.g., within the aperture 686). A visible light mask 680 may be a less expensive solution to coat a cover glass (e.g., cover glasses 101, 201, 301 from FIGS. 1-3) than applying a screened ink (e.g., screened ink 450, 650) or a dye impregnated medium (e.g., dye impregnated medium 555) to a large portion of a cover glass.

As with the screened ink 450 of FIG. 4, applying screened ink to a surface may exhibit "orange peel" or ripple across at least a portion of its back surface (e.g., back surface 654 of screened ink 650). To reduce the roughness of (and thereby improve the MTF of) the screened ink 650, a layer of optically clear medium 660 may be applied. The optically clear medium 660 may include a front surface 662 and a back surface 664. In the present embodiment, the front surface 662 of the optically clear medium 660 may be applied to the back surface 654 of the screened ink 650. The front surface 662 of the optically clear medium 660 may abut (e.g., directly contact) the back surface 654 of the screened ink 650. As illustrated, the optically clear medium 660 may cover less than the entirety of the back surface 654 of the screened ink 650.

In the present embodiment, the optically clear medium 660 may overlap at least a portion of the screened ink 650 and the visible light mask 680. In other embodiments, the optically clear medium 660 may only overlap the screened ink 650 such that the optically clear medium 660 remains within (e.g., has a major dimension equal to the major dimension 688 of the aperture 686) the aperture 686. In further embodiments, the optically clear medium 660 may overlap the screened ink 650 and only a portion of the visible light mask 680 such that the back surface 664 of the optically clear medium 660 does not extend further from the substrate 640 than the back surface 684 of the visible light mask 680.

The front surface 662 of the optically clear medium 660 may at least partially fill in and/or smooth out gaps formed by the back surface 654 of the screened ink. The screened ink 650 may have a first index of refraction and the optically clear medium 660 may have a second index of refraction.

In the present embodiment, the back surface 664 of the optically clear medium 660 is the innermost surface 624 of the infrared filter 620. In other embodiments, another surface may be the innermost surface 624 of the infrared filter 620. For example, if the visible light mask 680 has a thickness that is equal to a combined thickness of the screened ink 650 and the optically clear medium 660 and the screened ink 650 and the optically clear medium 660 are only applied within the aperture 686, the back surface 684 of the visible light mask 680 and the back surface 664 of the optically clear medium 660 would both be the innermost surfaces 624 of the infrared filter 620. In another example, if the visible light mask 680 has a thickness that is greater than a combined thickness of the screened ink 650 and the optically clear medium 660 and the screened ink 650 and the optically clear medium 660 are only applied within the aperture 686, the back surface 684 of the visible light mask 680 would be the innermost surface 624 of the infrared filter 620.

The front surface 682 of the visible light mask 680 and the front surface 652 of the screened ink 650 that abuts the back surface 644 of the substrate 640, in the present embodiment, are the same as the outermost surface 622 of the infrared filter 620. In other embodiments, the outermost surface 622 of the infrared filter 620 may include another surface of the infrared filter 620. The maximum thickness 626 may be measured through the thickness of the infrared filter 620 from the innermost surface 624 of the infrared filter 620 to the outermost surface 622 of the infrared filter 620. In other words, the maximum thickness 626 may be measured from the front surface 682 of the visible light mask 680 and the front surface 652 of the screened ink 650 that abuts the back surface 644 of the substrate 640 to the back surface 664 of the optically clear medium 660.

As illustrated, the screened ink 650 may cover less than the entire back surface 684 of the visible light mask 680 and the optically clear medium 660 may cover less than the entire back surface 654 of the screened ink 650, such that a terminal (e.g., outermost) edge 661 of the optically clear medium 660 does not overlap a terminal edge 651 of the screened ink 650 and that terminal edge 651 of the screened ink 650 does not overlap a terminal edge (not shown) of the visible light mask 680. In other embodiments, the terminal edge 661 of the optically clear medium 660 may align with or overlap the terminal edge 651 of the screened ink 650. In further embodiments, the terminal edge 651 of the screened ink 650 may align with or overlap the terminal edge (not shown) of the visible light mask 680.

The substrate 640, screened ink 650, and optically clear medium 660 may be formed of the same materials as described in connection with the substrate 440, screened ink 450, and optically clear medium 460 described in connection with FIG. 4. The visible light mask 680 may be formed of Nazdar NZE Solvent-Based Electronic Glass Screen Ink, Nazdar Ink Technologies of Shawnee, Kans., black or other similar opaque screening ink.

FIG. 7 is a cross-sectional view of a still further embodiment of an infrared filter 720 with an infrared camera module 730. The infrared camera module 730 may include an infrared sensor (not shown) and a lens 732. The infrared filter 720 may be similar to the infrared filters 420, 520, 620 described in connection with FIGS. 4-6. For example, the infrared filter 720 may include an outermost surface 722, an innermost surface 724, a maximum thickness 726, and a substrate 740.

The substrate 740 may include a front surface 742 and a back surface 744. The substrate 740 may be sized to cover the lens 732 of the camera module 730. The substrate 740 may be substantially the same as the substrates 440, 540, 640 described in connection with FIGS. 4-6.

One way in which the infrared filter 720 of FIG. 7 is similar to the infrared filter 520 of FIG. 5 and different from the infrared filters 420, 620 of FIGS. 4 and 6 is by combining the screened ink (e.g., screened ink 450, 650) and the optically clear medium (e.g., optically clear medium 460, 660) into a single dye impregnated medium 755 (similar to dye impregnated medium 555 in FIG. 5). The dye impregnated medium 755 may include a front surface 756 and a back surface 757.

The infrared filter 720 may be similar to the infrared filter 620 of FIG. 6 and may differ from the infrared filter 520 of FIG. 5 by including a visible light mask 780. The visible light mask 780 includes a front surface 782 and a back surface 784. The visible light mask 780 may define an aperture 786 through which visible light may transmit. The aperture 786 may be similar to the apertures 110, 210, 310 described in connection with FIGS. 1-3. The aperture 786 may have a major dimension 788 (e.g., a diameter or width). For example, the major dimension 788 may be between 1 mm and 5 mm, or any value therebetween. The infrared filter 720 and the aperture 786 may be positioned relative to the lens 732 as described in connection with the infrared filter 620 and the aperture 686 described in connection with FIG. 6.

In the present embodiment, the front surface 756 of the dye impregnated medium 755 may be applied to a portion of the back surface 744 of the substrate 740 (e.g., within the aperture 786) and a portion of the back surface 784 of the visible light mask 780 (e.g., outside of the aperture 786). The front surface 756 of the dye impregnated medium 755 may abut (e.g., directly contact) a portion of the back surface 744 of the substrate 740 and/or a portion of the back surface 784 of the visible light mask 780. In other embodiments, the dye impregnated medium 755 may overlap only a portion of the visible light mask 780 such that the back surface 757 of the dye impregnated medium 755 does not extend further from the substrate 740 than the back surface 784 of the visible light mask 780.

The dye impregnated medium 755 may be formed of the same materials as the dye impregnated medium 555 described in connection with FIG. 5. The dye impregnated medium 755 of FIG. 7 may differ from the dye impregnated medium 555 of FIG. 5 by using the visible light mask 780 to facilitate a uniform thickness rather than shims 570 from FIG. 5. In other words, the visible light mask 780 may be two visible light masks (e.g., one on the left and one on the right). In other embodiments, a single visible light mask 780 may enclose the aperture 786. For example, the formed aperture 786 may be circular, polygonal, or otherwise shaped.

The dye impregnated medium 755 may be applied without a screen. This may facilitate improved surface roughness on the back surface 757 of the dye impregnated medium 755.

In the present embodiment, the back surface 757 of the dye impregnated medium 755 is the innermost surface 724 of the infrared filter 720. In other embodiments, another surface may be the innermost surface 724 of the infrared filter 720.

In the present embodiment, the dye impregnated medium 755 may overlap at least a portion of the visible light mask 780. In other embodiments, the dye impregnated medium 760 may only overlap the visible light mask 780 such that the dye impregnated medium 755 remains within (e.g., has a major dimension equal to the major dimension 788 of the aperture 786) the aperture 786. In further embodiments, the dye impregnated medium 760 may overlap only a portion of the visible light mask 780 such that the back surface 757 of the dye impregnated medium 760 does not extend further from the substrate 740 than the back surface 784 of the visible light mask 780.

The maximum thickness 726 is illustrated as thinner than the maximum thickness 426, 626 shown in FIGS. 4 and 6.

However, the maximum thickness 726 may be thicker or thinner than the maximum thicknesses 426, 526, 626 shown in FIGS. 4-6.

In the present embodiment, the back surface 757 of the dye impregnated medium 755 is the innermost surface 724 of the infrared filter 720. In other embodiments, another surface may be the innermost surface 724 of the infrared filter 720. For example, if the visible light mask 780 has a thickness that is equal to the thickness of the dye impregnated medium 755 and the dye impregnated medium 755 is only applied within the aperture 786, the back surface 784 of the visible light mask 780 and the back surface 757 of the dye impregnated medium 755 would both be the innermost surface 724 of the infrared filter 720. In another example, if the visible light mask 780 has a thickness that is greater than the thickness of the dye impregnated medium 755 and the dye impregnated medium 755 is only applied within the aperture 786, the back surface 784 of the visible light mask 780 would be the innermost surface 724 of the infrared filter 720.

The front surface 782 of the visible light mask 780 and the front surface 756 of the dye impregnated medium 755 that abuts the back surface 744 of the substrate 740, in the present embodiment, are the same as the outermost surface 722 of the infrared filter 720. In other embodiments, the outermost surface 722 of the infrared filter 720 may include another surface of the infrared filter 720.

The maximum thickness 726 may be measured through the thickness of the infrared filter 720 from the innermost surface 724 of the infrared filter 720 to the outermost surface 722 of the infrared filter 720. In other words, the maximum thickness 726 may be measured from the front surface 782 of the visible light mask 780 and the front surface 756 of the dye impregnated medium 755 that abuts the back surface 744 of the substrate 740 to the back surface 764 of the dye impregnated medium 755 and/or the back surface 784 of the visible light mask 780.

As illustrated, the dye impregnated medium 755 may cover less than the entire back surface 784 of the visible light mask 780, such that a terminal (e.g., outermost) edge 758 of the dye impregnated medium 755 does not overlap a terminal edge (not shown) of the visible light mask 780. In other embodiments, the terminal edge 758 of the dye impregnated medium 755 may align with or overlap the terminal edge (not shown) of the visible light mask 780.

FIG. 8 is a cross-sectional view of an embodiment of an infrared filter 820 with an infrared camera module 830. The infrared filter 820 of FIG. 8 is the same as the infrared filter 420 of FIG. 4 and for brevity only the differences between the infrared filter 820 of FIG. 8 and the infrared filter 420 of FIG. 4 will be described. Thus, like elements (e.g., screened ink 850 in FIG. 8 and screened ink 450 in FIG. 4) have like numerals and the disclosure of FIG. 4 is incorporated into the description of FIG. 8 in its entirety. The infrared filter 820 of FIG. 8 includes both an outer substrate 840 and an inner substrate 890. The outer substrate 840 may be identical to the substrate 440 in FIG. 4.

Figure 28:
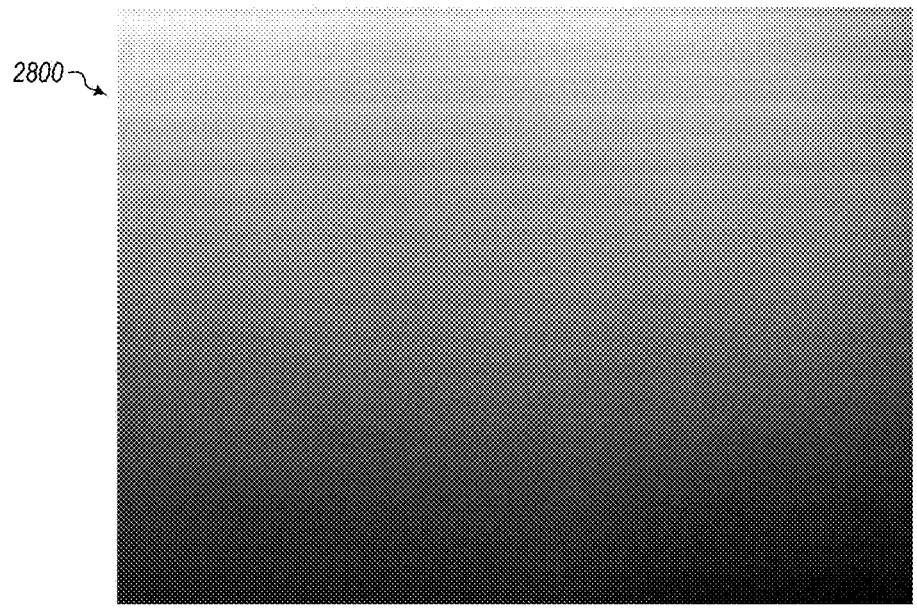
FIG. 28 illustrates a plot of surface roughness of a CLAREX® NIR75 filter.
Figure 29:
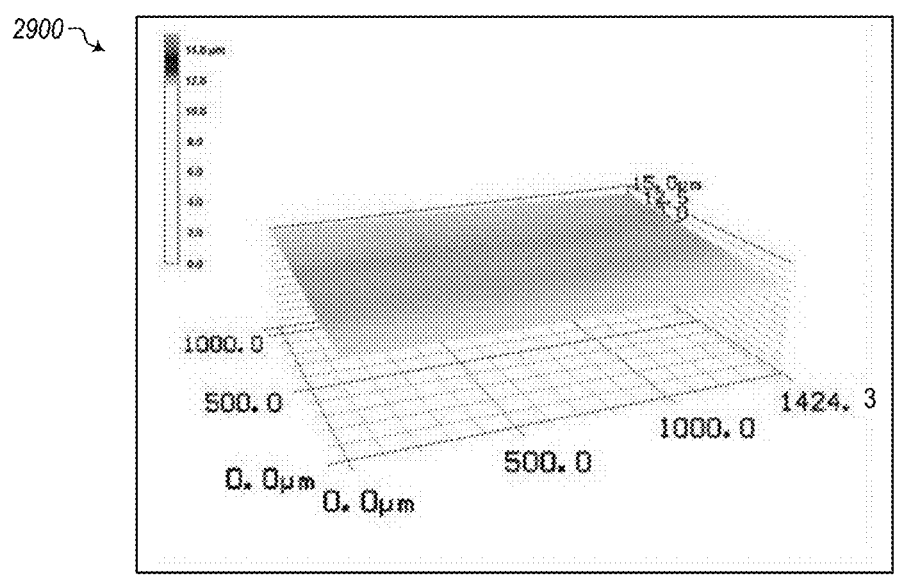
FIG. 29 illustrates another plot of surface roughness of a CLAREX® NIR75 filter.

The inner substrate 890 may include a specular acrylic sheet, a compounded infrared transmissive/visible light blocking filter sheet (e.g., a CLAREX® NIR75 filter available from Astra Products of Baldwin, N.Y.), clear glass, hardened glass, acrylic, polycarbonate. The back surface 464 of the optically clear medium 460 in FIG. 4 may be flat (e.g., specularly flat). By adding the inner substrate 890 to the back surface 864 of the optically clear medium the surface roughness of the innermost surface 824 of the infrared filter 820 may be improved. For example, as shown in FIGS. 28 and 29, the surface roughness of a CLAREX® NIR75 filter available from Astra Products of Baldwin, N.Y. is about 0.0605 μm.

The screened ink 850 may have a first index of refraction, the optically clear medium 860 may have a second index of refraction, and the inner substrate 890 may have a third index of refraction. In some embodiments, in order to avoid any substantial impact on MTF of the imaging system, it may be preferable that the indices of refraction of the screened ink 850 and the optically clear ink 850 may be matched such that the difference between the indices of refraction is $\Delta n=0$. Under such condition, scatter due to surface ripple of back surface of screened ink 854 is nulled and there is no impact on system MTF, as long as the back surface is formed specularly smooth and a non-scattering IR-transmissive/visible-block media is used as the wavelength dependent spectral filter media, such as dyes which may be compounded in polymer or may be dissolved in a medium, such as an adhesive, or may be mixed in ink base, which exhibits low or no volume scattering. Depending on the resolution performance requirements of the application, such as fingerprint, face, and iris recognition, the maximum allowed difference in indices of refraction may vary. Typically, iris recognition will have the tightest requirement on $\Delta n$, followed by face recognition and then fingerprint recognition. The maximum allowed $\Delta n$ is also dependent on the level of surface roughness as well, as a surface having higher surface roughness will require tighter $\Delta n$ than an embedded back surface of screened ink 854 having less surface roughness. The difference in indices of refraction ($\Delta n$) between the screened ink 850 and the optically clear medium 860 may be less than 0.02, less than 0.005, or any values therebetween.

In the present embodiment, the front surface 852 of the screened ink 850, is the outermost surface 822 of the infrared filter 820 and the back surface 894 of the inner substrate 890 is the innermost surface 824 of the infrared filter 820. In other embodiments, other surfaces may be the outermost surface 822 and/or the innermost surface 824 of the infrared filter 820. The infrared filter 820 may have a maximum thickness 826. The maximum thickness 826 may be measured through the thickness of the infrared filter 820 from the outermost surface 822 of the infrared filter 820 to the innermost surface 824 of the infrared filter 820. In other words, the maximum thickness 826 may be measured from the front surface 852 of the screened ink 850 to the back surface 894 of the inner substrate 890.

The inner substrate 890, as shown in FIG. 8, may extend less than an entire length of the infrared filter 820. In other embodiments, the inner substrate 890 may extend an entire length of the infrared filter 820. In the embodiment shown in FIG. 8, the front surface of innermost substrate 890 may serve as the flat forming mold to limit or null surface roughness at the interface between front surface of innermost substrate 890 and the back surface of optically clear medium 860, such that a mold is not required to form the specularly smooth and flat interface, and back surface of innermost substrate 890, which is the innermost surface 824 of infrared filter 820, is also adequately smooth for application requirements. This forms a lamination of innermost substrate to the filter stack.

FIG. 9 is a cross-sectional view of another embodiment of an infrared filter 920 with an infrared camera module 930. The infrared filter 920 of FIG. 9 is the same as the infrared filter 520 of FIG. 5 and for brevity only the differences between the infrared filter 920 of FIG. 9 and the infrared filter 520 of FIG. 5 will be described. Thus, like elements (e.g., dye impregnated medium 955 in FIG. 9 and dye impregnated medium 555 in FIG. 5) have like numerals and the disclosure of FIG. 5 is incorporated into the description of FIG. 9 in its entirety. The infrared filter 920 of FIG. 9 includes both an outer substrate 940 and an inner substrate 990. The outer substrate 940 may be identical to the substrate 540 in FIG. 5.

In the present embodiment, the front surface 956 of the dye impregnated medium 955, in the present embodiment, is the outermost surface 922 of the infrared filter 920 and the back surface 994 of the inner substrate 990 is the innermost surface 924 of the infrared filter 920. In other embodiments, other surfaces may be the outermost surface 922 and/or the innermost surface 924 of the infrared filter 920.

Unlike the embodiment of an infrared filter 520 shown in FIG. 5, in the present embodiment, the back surface 957 of the dye impregnated medium 955 abuts the front surface 992 of the inner substrate 990, such that the back surface 994 of the inner substrate 990 is the innermost surface 924 of the infrared filter 920. In other embodiments, another surface may be the innermost surface 924 of the infrared filter 920. The infrared filter 920 may have a maximum thickness 926. The maximum thickness 926 may be measured through the thickness of the infrared filter 920 from the outermost surface 922 of the infrared filter 920 to the innermost surface 924 of the infrared filter 920. In other words, the maximum thickness 926 may be measured from the front surface 956 of the dye impregnated medium 955 to the back surface 994 of the inner substrate 990.

The dye impregnated medium 955 may have a first index of refraction and the inner substrate 990 has a second index of refraction. The difference in index of refraction (Δn) between the dye impregnated medium 955 and the inner substrate 990 may be less than or equal to 0.02.

The inner substrate 990 may include a specular acrylic sheet, a compounded infrared transmissive/visible light blocking filter sheet (e.g., a CLAREX® NIR75 filter available from Astra Products of Baldwin, N.Y.), clear glass, hardened glass, acrylic, polycarbonate. In some embodiments, the dye impregnated medium 955 may be replaced with an optically clear medium, such as optically clear mediums 460, 660, 860, and the inner substrate 990 may be impregnated with dye. In other embodiments, the inner substrate 890 may be clear when used with a dye impregnated medium 955.

FIG. 10 is a cross-sectional view of a further embodiment of an infrared filter 1020 with an infrared camera module 1030. The infrared filter 1020 of FIG. 10 is the same as the infrared filter 620 of FIG. 6 and for brevity only the differences between the infrared filter 1020 of FIG. 10 and the infrared filter 620 of FIG. 6 will be described. Thus, like elements (e.g., screened ink 1050 in FIG. 10 and screened ink 650 in FIG. 6) have like numerals and the disclosure of FIG. 6 is incorporated into the description of FIG. 10 in its entirety. The infrared filter 1020 of FIG. 10 includes both an outer substrate 1040 and an inner substrate 1090. The outer substrate 1040 may be identical to the substrate 640 in FIG. 6.

The inner substrate 1090 may include a specular acrylic sheet, a compounded infrared transmissive/visible light blocking filter sheet (e.g., a CLAREX® NIR75 filter available from Astra Products of Baldwin, N.Y.), clear glass, hardened glass, acrylic, polycarbonate. The back surface 664 of the optically clear medium 660 in FIG. 6 may be flat (e.g., specularly flat). By adding the inner substrate 1090 to the back surface 1064 of the optically clear medium 1060, the surface roughness of the innermost surface 1024 of the infrared filter 1020 may be improved. For example, as shown in FIGS. 28 and 29, the surface roughness of a CLAREX® NIR75 filter available from Astra Products of Baldwin, N.Y. is about 0.0605 μm.

The screened ink 1050 may have a first index of refraction, the optically clear medium 1060 may have a second index of refraction, and the inner substrate 1090 may have a third index of refraction. The difference in indices of refraction (Δn) between the screened ink 1050, the optically clear medium 1060, and the inner substrate 1090 may be less than 0.02, less than 0.005, or any values therebetween.

The front surface 1082 of the visible light mask 1080 and the front surface 1052 of the screened ink 1050 that abuts the back surface 1044 of the outer substrate 1040, in the present embodiment, are the same as the outermost surface 1022 of the infrared filter 1020. In other embodiments, the outermost surface 1022 of the infrared filter 1020 may include another surface of the infrared filter 1020. The back surface 1094 of the inner substrate 1090, in the present embodiment, is the innermost surface 1024 of the infrared filter 1020. In other embodiments, another surface may be the innermost surface 1024 of the infrared filter 1020.

The infrared filter 1020 may have a maximum thickness 1026. The maximum thickness 1026 may be measured through the thickness of the infrared filter 1020 from the outermost surface 1022 of the infrared filter 1020 to the innermost surface 1024 of the infrared filter 1020. In other words, the maximum thickness 1026 may be measured from the front surface 1082 of the visible light mask 1080 and the front surface 1052 of the screened ink 1050 that abuts the back surface 1044 of the outer substrate 1040 to the back surface 1094 of the inner substrate 1090.

In the present embodiment, the inner substrate 1090 may overlap at least a portion of the optically clear medium 1060, the screened ink 1050, and the visible light mask 1080. In some embodiments, the inner substrate 1090 may only overlap a portion of the screened ink 1050 and the visible light mask 1080. In further embodiments, the inner substrate 1090 may only overlap a portion of the visible light mask 1080. In still further embodiments, the inner substrate 1090 may overlap an entirety of the screened ink 1050, the optically clear medium 1060, the visible light mask 1080, or combinations thereof.

FIG. 11 is a cross-sectional view of a still further embodiment of an infrared filter 1120 with an infrared camera module 1130. The infrared filter 1120 of FIG. 11 is the same as the infrared filter 720 of FIG. 7 and for brevity only the differences between the infrared filter 1120 of FIG. 11 and the infrared filter 720 of FIG. 7 will be described. Thus, like elements (e.g., dye impregnated medium 1155 in FIG. 11 and dye impregnated medium 755 in FIG. 7) have like numerals and the disclosure of FIG. 7 is incorporated into the description of FIG. 11 in its entirety. The infrared filter 1120 of FIG. 11 includes both an outer substrate 1140 and an inner substrate 1190. The outer substrate 1140 may be identical to the substrate 740 in FIG. 7.

The front surface 1182 of the visible light mask 1180 and the front surface 1156 of the dye impregnated medium 1155 that abuts the back surface 1144 of the outer substrate 1140, in the present embodiment, are the same as the outermost surface 1122 of the infrared filter 1120. In other embodiments, the outermost surface 1122 of the infrared filter 1120 may include another surface of the infrared filter 1120.

Unlike the embodiment of an infrared filter 720 shown in FIG. 7, in the present embodiment, the back surface 1157 of the dye impregnated medium 1155 abuts the front surface 1192 of the inner substrate 1190, such that the back surface 1194 of the inner substrate 1190 is the innermost surface 1124 of the infrared filter 1120. In other embodiments, another surface may be the innermost surface 1124 of the infrared filter 1120. The infrared filter 1120 may have a maximum thickness 1126.

The maximum thickness 1126 may be measured through the thickness of the infrared filter 1120 from the outermost surface 1122 of the infrared filter 1120 to the innermost surface 1124 of the infrared filter 1120. In other words, the maximum thickness 1126 may be measured from the front surface 1182 of the visible light mask 1180 and the front surface 1156 of the dye impregnated medium 1155 that abuts the back surface 1144 of the outer substrate 1140 to the back surface 1194 of the inner substrate 1190.

The dye impregnated medium 1155 may have a first index of refraction and the inner substrate 1190 has a second index of refraction. The difference in index of refraction (Δn) between the dye impregnated medium 1155 and the inner substrate 1190 may be less than or equal to 0.02.

The inner substrate 1190 may include a specular acrylic sheet, a compounded infrared transmissive/visible light blocking filter sheet (e.g., a CLAREX® NIR75 filter available from Astra Products of Baldwin, N.Y.), clear glass, hardened glass, acrylic, polycarbonate. In some embodiments, the dye impregnated medium 1155 may be replaced with an optically clear medium, such as optically clear mediums 460, 660, 860, and the inner substrate 1190 may be impregnated with dye. In other embodiments, the inner substrate 890 may be clear when used with a dye impregnated medium 1155.

Various considerations, such as visible light wavelength and/or range of wavelengths, infrared light wavelength and/or range of wavelengths, spectral transmission (e.g., the amount of light transmitted through an infrared filter) over a light wavelength (e.g., visible and/or infrared) and/or range of wavelengths, differences in index of refraction (Δn), impact on MTF (e.g., as a percentage), thickness of the infrared filter, or combinations thereof, may be used to design an infrared filter. As such, various combinations of these considerations and values or ranges of values are contemplated as a part of at least one embodiment of the present invention. Examples values and ranges of values and combinations of values are provided below:

In at least one embodiment of an infrared filter described herein, the infrared filter has a surface roughness ($R_a$) of less than 0.28 µm. For example, the combined surface roughness of the screened ink (e.g., screened ink 450) and the optically clear adhesive (e.g., optically clear medium 460) may be less than 0.28 µm. In at least one embodiment, the infrared filter has a surface roughness of less than or including 0.278 µm, 0.2410 µm, 0.1989 µm, 0.0605 µm, or any value therebetween.

Matching an index of refraction of a first material to an index of refraction of a second material according to at least one embodiment herein includes a Δn of less than 0.02, less than 0.01, or any values therebetween. In some embodiments, for facial recognition applications, a Δn of less than 0.02 may be desirable. For iris recognition applications, a Δn of less than 0.01 may be desirable.

In at least one embodiment, an infrared filter described herein has a total thickness from the outermost surface to an innermost surface of less than 520 µm, 220 µm, 150 µm, 100 µm, 50 µm, 20 µm, 5 µm, or any value therebetween. In some embodiments, the coverglass may be in the range of 0.4 mm to 0.7 mm thick, as a common thickness today for mobile devices is 0.55 mm glass. In embodiments where plastic coverglass may be used, the coverglass may be thicker due to reduced rigidity, or similar if device strength is increased due to lamination of the device stack including display.

At least one embodiment of an infrared filter having a substrate, with screened ink, and optically clear adhesive, has a difference in index of refraction (Δn) between the screened ink and optically clear adhesive that is less than 0.02; the impact of the substrate, screened ink, and optically clear adhesive to MTF that is less than 7% loss in modulation at the object space spatial frequency of 0.11 cycles per mm at the face object; the surface roughness is less than 0.28 µm; the spectral transmission of infrared light centered at 850 nm or 940 nm of the infrared filter is more than 75%; and an overall thickness from an outermost surface to an innermost surface of less than 50 µm.

At least one embodiment of an infrared filter described herein may have a spectral transmission that blocks a wavelength or a range of wavelengths of visible light that contacts the outermost surface (e.g., outermost surface 422) of the infrared filter that includes blocking 95%, 96%, 97%, 98%, 99%, 100%, or any values therebetween. For example, at least one embodiment of an infrared filter as described herein may block between 95% and 99% of a wavelength or a range of wavelengths of visible light that contacts the outermost surface of the infrared filter. In another example, at least one embodiment of an infrared filter described herein may block 99% of a wavelength or a range of wavelengths of visible light that contacts the surface of the infrared filter. In a further example, at least one embodiment of an infrared filter as described herein may block more than 99% of a wavelength or a range of wavelengths of visible light that contacts the surface of the infrared filter.

In at least one embodiment of an infrared filter having a substrate, with screened ink, and optically clear medium, the difference in index of refraction between the screened ink and optically clear medium is less than 0.01; the impact of the substrate, screened ink, and optically clear medium to MTF that is less than a 7% loss of modulation at the object space spatial frequency of 0.11 cycles per mm at the face object in object space being imaged by the imaging system, or for iris recognition less than a 5% loss of modulation at the object space spatial frequency of 2 cycles per mm at the iris object in object space being imaged by the imaging system; the surface roughness is less than 0.2410 µm; the spectral transmission of infrared light centered at 850 nm or 940 nm of the infrared filter is more than 85%; and an overall thickness from an outermost surface to an innermost surface of less than 25 µm.

In at least one embodiment of an infrared filter having an outer substrate (e.g., glass), with screened ink, optically clear medium, and an inner substrate, the difference in index of refraction between the screened ink and optically clear medium is less than 0.02; the impact of the substrate, screened ink, and optically clear medium to MTF that is less than a 7% loss of modulation at the object space spatial frequency of 0.11 cycles per mm at the face object in object space being imaged by the imaging system, or for iris recognition less than a 5% loss of modulation at the object space spatial frequency of 2 cycles per mm at the iris object in object space being imaged by the imaging system; the surface roughness is less than 0.1 µm; the spectral transmission of infrared light centered at 850 nm or 940 nm of the infrared filter is more than 75%; and an overall thickness from an outermost surface to an innermost surface of less than 520 µm.

In at least one embodiment of an infrared filter having an outer substrate (e.g., glass), with screened ink, optically clear medium, and a clear window, the difference in index of refraction between the screened ink and optically clear medium is less than 0.01; the impact of the substrate, screened ink, and optically clear medium to MTF that is for face recognition less than a 7% loss of modulation at the object space spatial frequency of 0.11 cycles per mm at the face object in object space being imaged by the imaging system, or for iris recognition less than a 5% loss of modulation at the object space spatial frequency of 2 cycles per mm at the iris object in object space being imaged by the imaging system; the surface roughness is less than 0.1 µm; the spectral transmission of infrared light centered at 850 nm or 940 nm of the infrared filter is more than 85%; and an overall thickness from an outermost surface to an innermost surface of less than 220 µm.

I. EXAMPLES

FIG. 12 is a photograph of an embodiment of an infrared filter 1220. The infrared filter 1220 includes a substrate 1240. A screened ink 1250 has been applied to the entire shown surface of the substrate 1240. Two portions of optically clear medium 1260 have been applied to the screened ink 1250 on the substrate 1240.

A mold 1291 was used to form a flat back surface (e.g., back surfaces 464, 664, 864, 1064 shown in FIGS. 4, 6, 8, and 10) to the optically clear medium 1260. The mold 1291 may include a clear silicone block. The mold 1291 as shown is relatively thin. In other embodiments, the mold 1291 may have a thickness between 3 mm and 12 mm. Thicker molds may result in a more flat (e.g., planar) surface, while thinner molds may be subject to bending or other forces that may result in less flat (e.g., more curved) surfaces. Harder molds may result in a more flat surface, while softer molds may be subject to bending or other forces that may result in less flat surfaces. When using UV-cure adhesives, adequate time may be used to allow adhesive to wet thoroughly and equalize across the mold to ensure a given level of flatness prior to UV curing by exposure to UV light. Embodiments that use a UV transparent mold media, including clear silicone, may enable UV exposure, thus curing, through the mold.

The infrared filter 1220 may be formed (e.g., "flat cast") using an embodiment of a method of manufacturing the infrared filter. In a first act, a screened ink 1250 may be applied to a substrate 1240. Applying a screened ink 1250 may include applying a mesh to the substrate and applying the screened ink to the mesh. The mesh is then removed and the screened ink 1250 is allowed to cure. Curing the screened ink 1250 may include exposing the screened ink 1250 to ambient air conditions. In other embodiments, curing the screened ink 1250 may include applying an external source (e.g., heat, visible light, ultraviolet light, air currents. While UV-cure adhesives are convenient and may be efficiently applied and cured, other adhesives including 2-part epoxies and curable resins (drying or UV-cure) may also be used to achieve similar index-matching effect.

In another act, the optically clear medium 1260 may be applied to a back surface of the screened ink 1250. Applying the optically clear medium 1260 may include dispensing controlled amounts through use of a liquid adhesive dispenser, which may be manually placed or may be dispensed by programmable automation, wetted through a mold via to surface using capillary action to wet adhesive to region with mold in place, wetted or wicked between substrates for case of using an inner substrate, sprayed on region of interest through use of spray masking to avoid spray on non-filter regions, brushed, otherwise applied, or combinations thereof. Once the optically clear medium 1260 is applied, the mold 1291 may be applied to a back surface of the optically clear medium 1260. The optically clear medium 1260 may then be cured. Curing the optically clear medium 1260 may include applying ultraviolet light to the optically clear medium 1260 through the mold 1291. In other embodiments, curing the optically clear medium 1260 may include applying an external source (e.g., heat, visible light, ultraviolet light, air currents, a chemical reaction such as by a 2-part epoxy, other external sources, or combinations thereof. After the optically clear medium 1260 has cured, the mold 1291 may be removed to complete the infrared filter 1220. A flexible and non-stick mold, such as silicone, may help facilitate release of the mold. While a flexible mold may be advantageous in mold removal, a rigid mold may be used in conjunction with mold release agent and heat using CTE mismatch in order to help facilitate mold release. In some embodiments, it may be desirable to select an optically clear medium 1260 which exhibits good or adequate adhesion to the screened ink 1240 or 1250.

Figure 13:
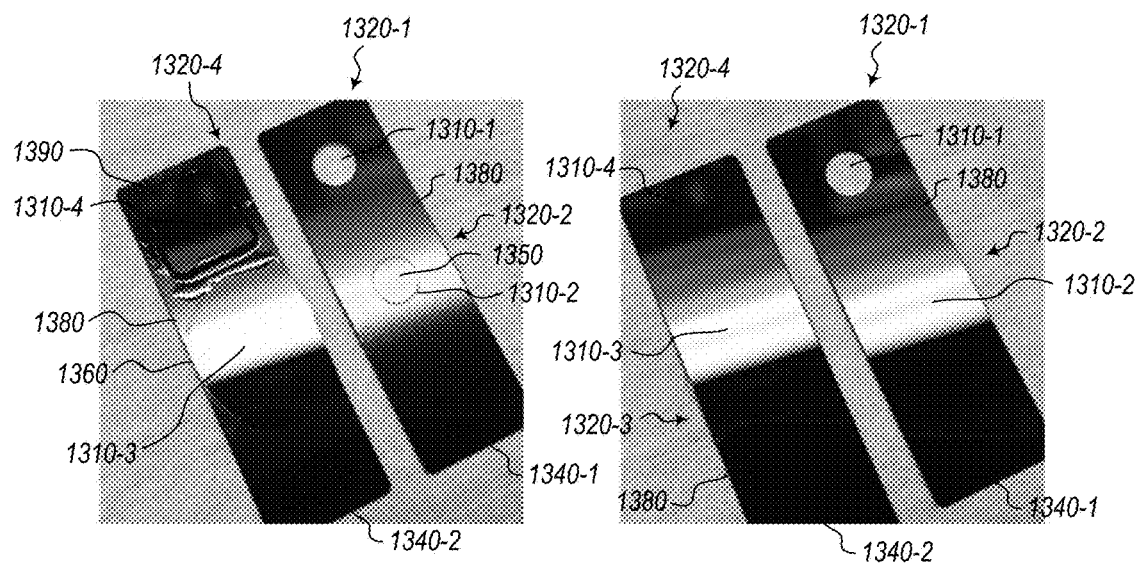
FIG. 13 shows two photographs of three embodiments of an infrared filter and an unfiltered aperture.

FIG. 13 shows two photographs of three embodiments of an unfiltered aperture 1320-1 and an infrared filter 1320-2, 1320-3, 1320-4. The photograph on the left is an underside of two substrates 1340-1, 1340-2. The photograph on the right is a corresponding top side of the substrates 1340-1, 1340-2.

The first substrate 1340-1 has a visible light mask 1380 applied to it over the entire surface of the first substrate 1340-1 but for the first aperture 1310-1 and the second aperture 1310-2. The second substrate 1340-2 has a visible light mask 1380 applied to it over the entire surface of the second substrate 1340-2 but for the third aperture 1310-3 and the fourth aperture 1310-4.

The apertures 1310-1, 1310-2, 1310-3, 1310-4 may be similar to the apertures 110, 210, 310, 686, 786, 1086, 1186 described in connection with FIGS. 1-3, 6-7, and 10-11. The aperture 1310-1 of the unfiltered aperture 1320-1 is readily visible from both the underside and the top side of the first substrate 1340-1, as the aperture 1310-1 does not have any screened ink or other filter applied to the aperture 1310-1.

The first embodiment of an infrared filter 1320-2 has a screened ink 1350 applied to the second aperture 1310-2. The screened ink 1350 is an IR transmit/Visible block ink. As can be seen, the second aperture 1310-2 is visible on the underside of the first substrate 1340-1, but is less visible on the top side of the first substrate 1340-1.

The second embodiment of an infrared filter 1320-3 has a screened ink 1350 applied to the third aperture 1310-3 with an optically clear medium 1360 "flat cast" to the screened ink 1350. The screened ink 1350 is an IR transmit/Visible block ink. As can be seen, the third aperture 1310-3 is not visible on the underside of the second substrate 1340-2 or on the top side of the second substrate 1340-2.

The third embodiment of an infrared filter 1320-4 has a screened ink (not shown) applied to the fourth aperture 1310-4 with an optically clear medium 1360 "flat cast" to the screened ink 1350 and an inner substrate 1390, which, in the present embodiment, is a compounded infrared transmissive/visible light blocking filter sheet (e.g., a CLAREX® NIR75 filter available from Astra Products of Baldwin, N.Y.). The screened ink 1350 is an IR transmit/Visible block ink. As can be seen, the fourth aperture 1310-4 is not visible on the underside of the second substrate 1340-2 or on the top side of the second substrate 1340-2.

Figure 14:
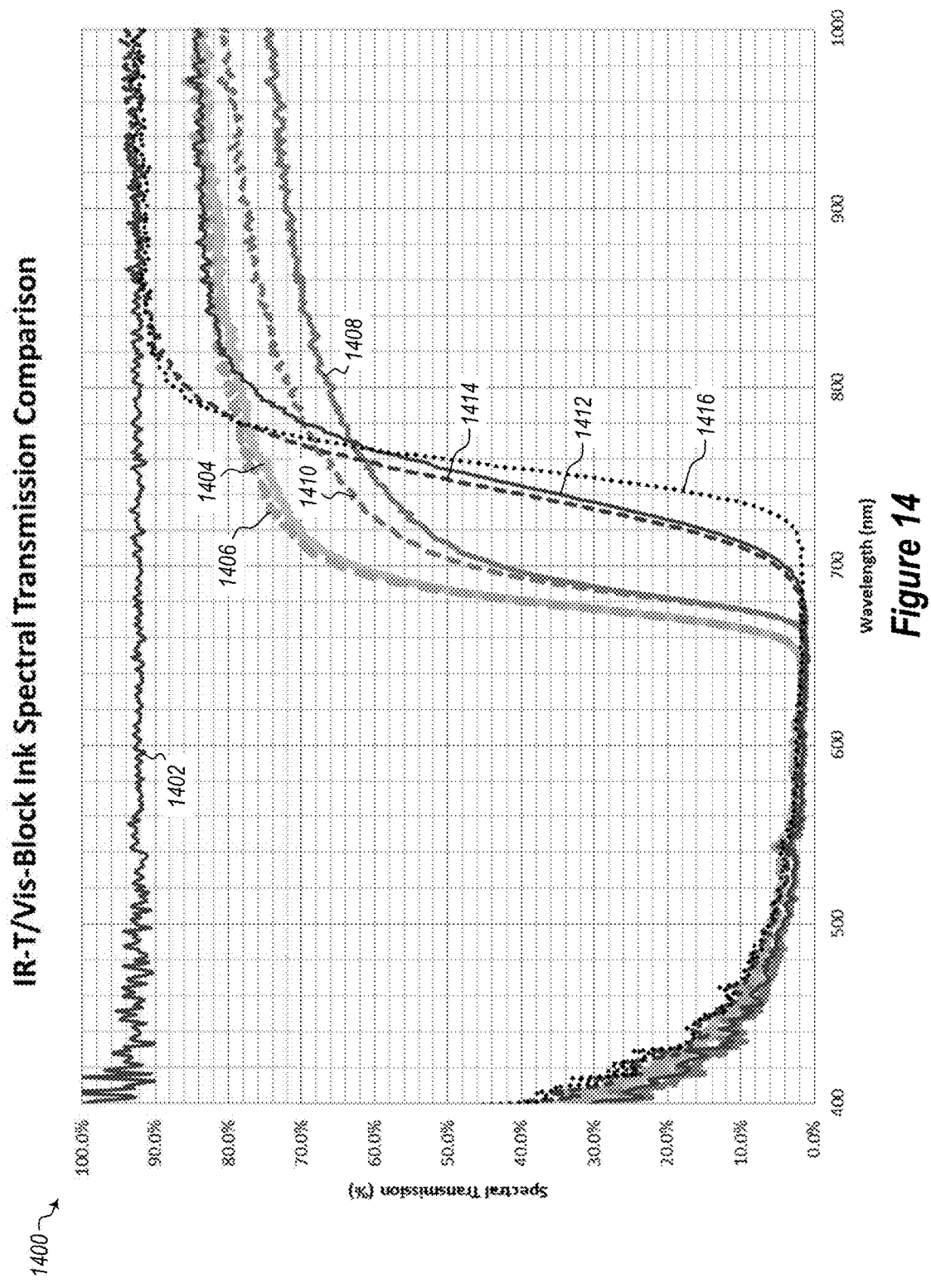
FIG. 14 illustrates a graph of a comparison of spectral transmissions between glass and three types of screened ink, three types of screened ink with flat cast optically clear adhesive, and a compounded infrared transmissive/visible light blocking filter sheet.

FIG. 14 illustrates a graph 1400 of a comparison of spectral transmissions between glass 1402, a single pass of Teikoku IRK-HF40908 ink 1404, a single pass of Teikoku HF40908 ink with flat cast Norland optical adhesive 81 1406, two passes of Teikoku IRK-HF40908 ink 1408, two passes of Teikoku IRK-HF40908 ink with flat cast Norland optical adhesive 81 1410, an IR transmit/Visible block ink 1412, an IR transmit/Visible block ink with flat cast Norland optical adhesive 81 1414, and a CLAREX® NIR75 filter 1416 available from Astra Products of Baldwin, N.Y. While spectral transmission alone may be measured using an integrating sphere, such test does not indicate loss due to scatter. These values were obtained using a pseudo-collimated spectral transmission setup, such that both impact on spectral transmission as well as scatter contribute to overall impact on spectral transmission. For samples where scatter is not present or low, the setup substantially measures only spectral transmission, while for samples having scatter, i.e. due to surface roughness, the setup measurement includes impact of scatter in addition to spectral transmission. In such way, it will be shown that scatter may impact both effective transmission as well as MTF.

As can be seen by the graph 1400, the spectral transmission of glass 1402 is approximately 92% from wavelengths of about 400 nm to about 1000 nm. The spectral transmission of a single pass of Teikoku IRK-HF40908 ink 1404, a single pass of Teikoku IRK-HF40908 ink with flat cast Norland optical adhesive NOA81 1406, two passes of Teikoku IRK-HF40908 ink 1408, two passes of Teikoku IRK-HF40908 ink with flat cast Norland optical adhesive NOA81 1410, the IR transmit/Visible block ink 1412, the IR transmit/Visible block ink with flat cast Norland optical adhesive NOA81 1414, and the CLAREX® NIR75 filter 1416 over the range of visible light is about 5%.

Considering use of an IR LED light source having centroid near 850 nm as IR illumination, the spectral transmission of a single pass of Teikoku IRK-HF40908 ink 1404 over the range of infrared light is about 81%. The spectral transmission of a single pass of Teikoku IRK-HF40908 ink with flat cast Norland optical adhesive NOA81 1406 over the range of infrared light is about 83%. The spectral transmission of two passes of Teikoku IRK-HF40908 ink 1408 over the range of infrared light is about 70%. The spectral transmission of two passes of Teikoku IRK-HF40908 ink with flat cast Norland optical adhesive NOA81 1410 over the range of infrared light is about 76%. The spectral transmission of the IR transmit/Visible block ink 1412 over the range of infrared light is about 83%. The spectral transmission of the IR transmit/Visible block ink with flat cast Norland optical adhesive NOA81 1414 over the range of infrared light is about 90%. The spectral transmission of the CLAREX® NIR75 filter 1416 over the range of infrared light is about 91%.

Figure 15:
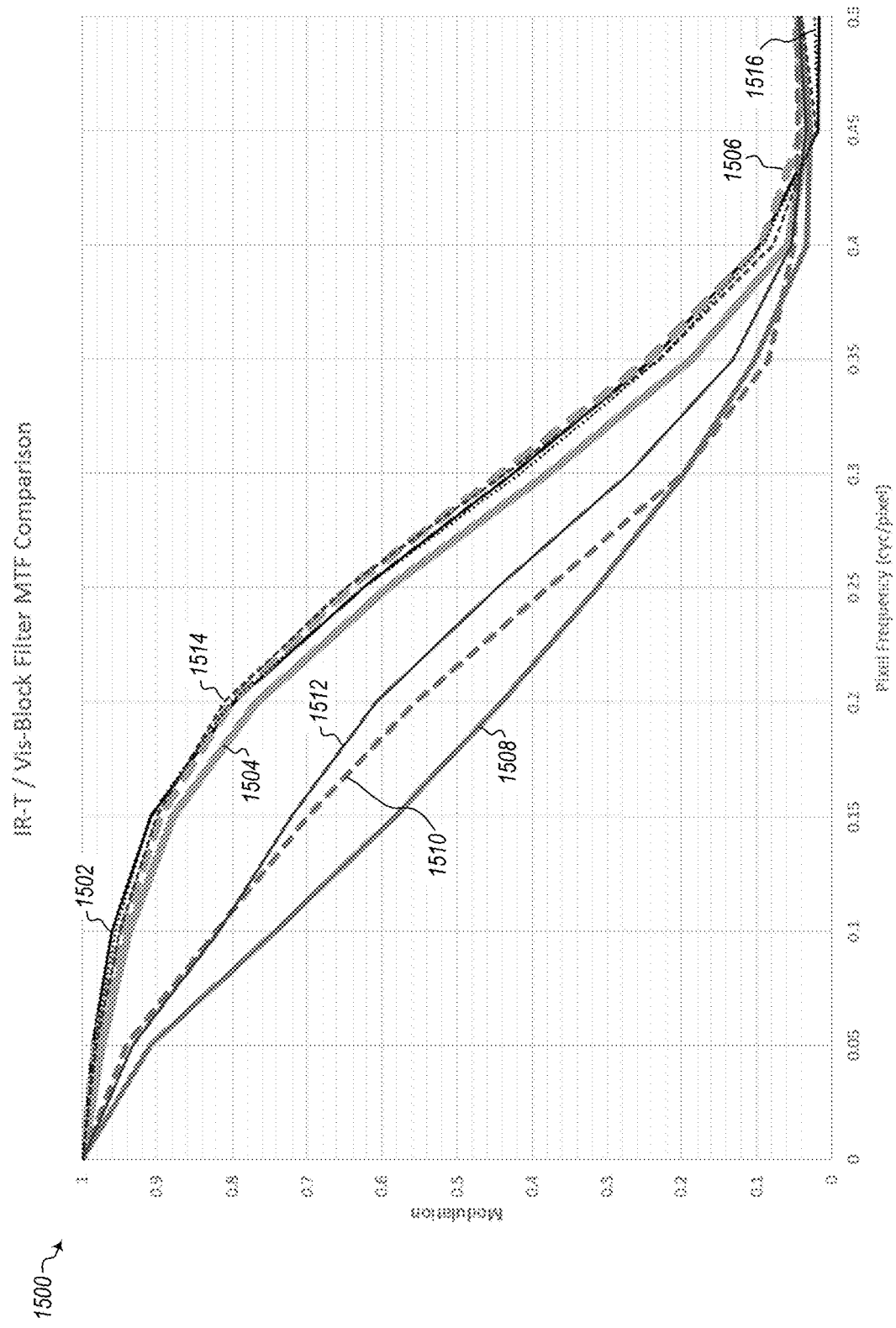
FIG. 15 illustrates a graph of a comparison of the modulation transfer function (MTF) over the pixel frequency in cycles per pixel between glass and three types of screened ink, three types of screened ink with flat cast optically clear adhesive, and a compounded infrared transmissive/visible light blocking filter sheet.

FIG. 15 illustrates a graph 1500 of a comparison of the modulation transfer function (MTF) over the pixel frequency in cycles per pixel between glass 1502, a single pass of Teikoku IRK-HF40908 ink 1504, a single pass of Teikoku IRK-HF40908 ink with flat cast Norland optical adhesive NOA81 1506, two passes of Teikoku IRK-HF40908 ink 1508, two passes of Teikoku IRK-HF40908 ink with flat cast Norland optical adhesive NOA81 1510, the IR transmit/Visible block ink 1512, the IR transmit/Visible block ink with flat cast Norland optical adhesive NOA81 1514, and a CLAREX® NIR75 filter 1516 available from Astra Products of Baldwin, N.Y. These MTF responses were obtained using images of knife edges which were backlit with uniform IR illumination. MTF of adjacent slices within a region of interest were assessed using IMAtest software. In many embodiments, the relative magnitude of MTF between the cases is of key importance, especially near the spatial frequency which represents 0.11 cycles per mm at a face object in object space placed at 1000 mm distance, which corresponds to a pixel frequency of near 0.25 cycles per pixel in FIG. 15. For the system depicted, the target specification is 50% modulation at ½ Nyquist, which corresponds to near 0.11 cycles per mm at an object placed at 1000 mm from camera module.

As can be seen in the graph 1500, the impact of the single pass of Teikoku HF40908 ink 1504, the single pass of Teikoku IRK-HF40908 ink with flat cast Norland optical adhesive NOA81 1506, the IR transmit/Visible block ink with flat cast Norland optical adhesive NOA81 1514, and the CLAREX® NIR75 filter 1516 on MTF are very small compared to glass 1502 (e.g., a drop in MTF modulation of less than 5% is considered small and acceptable for the face recognition system shown, and thus these options are considered acceptable from a standpoint of MTF). However, the impact of the IR transmit/Visible block ink 1512, the two passes of Teikoku IRK-HF40908 ink 1508, and the two passes of Teikoku IRK-HF40908 ink with flat cast Norland optical adhesive NOA81 1510 on MTF are very large (e.g., exhibit greater than 5% loss impact on MTF at ½ Nyquist, which is at 0.25 cycles per pixel on graph, dropping from greater than 60% modulation to less than 46% for these cases). Thus, the IR transmit/Visible block ink 1512 alone, two passes of Teikoku IRK-HF40908 ink, whether with or without flat cast optically clear adhesive, appear to be unsatisfactory for facial recognition and iris recognition processes.

Figure 16:
FIG. 16 illustrates a plot of surface roughness of a single pass of Teikoku IRK-HF40908 ink.
Figure 18:
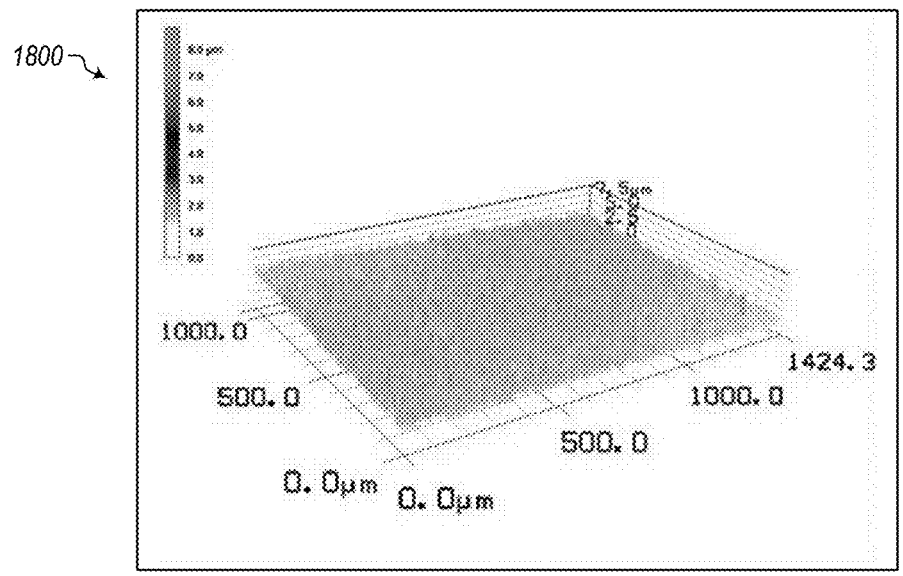
FIG. 18 illustrates another plot of surface roughness of a single pass of Teikoku HF40908 ink.

FIGS. 16 and 18 illustrate plots 1600, 1800 of surface roughness of a single pass of Teikoku IRK-HF40908 ink. These values were obtained using a Keyence scanning confocal microscope model VK-X200. Based on the plots 1600, 1800, the single pass of Teikoku IRK-HF40908 ink has a surface roughness ($R_a$) of 0.5064 μm.

Figure 17:
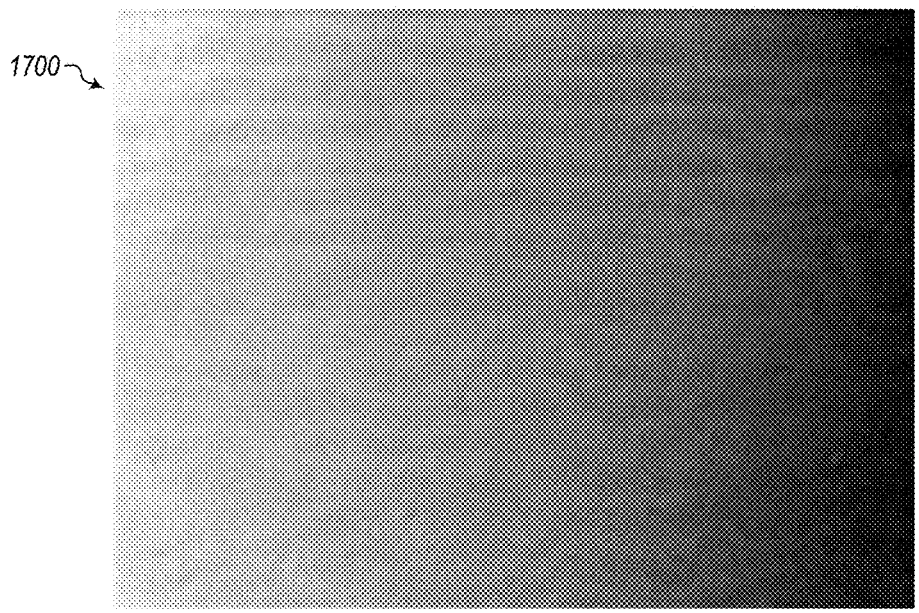
FIG. 17 illustrates a plot of surface roughness of a single pass of Teikoku IRK-HF40908 ink with flat cast Norland Products optical adhesive NOA81.
Figure 19:
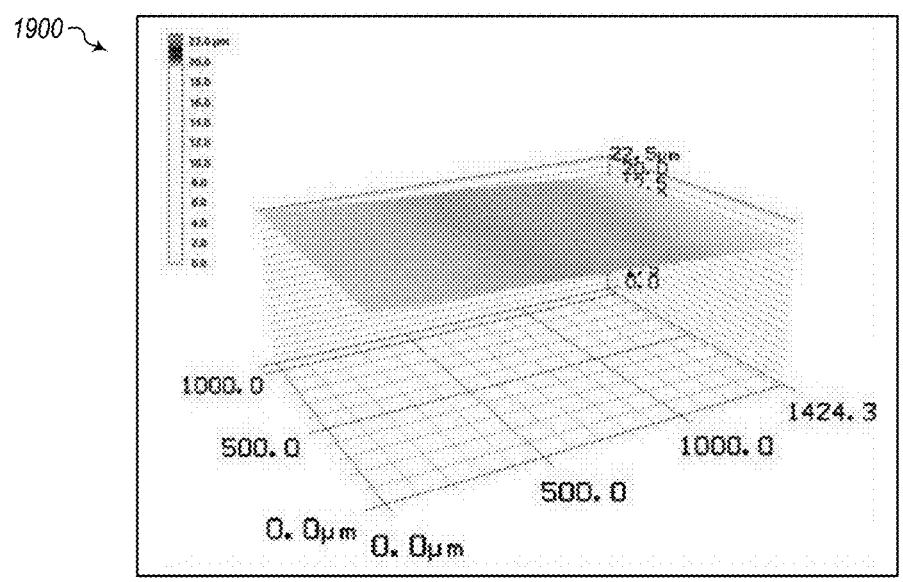
FIG. 19 illustrates another plot of surface roughness of a single pass of Teikoku HF40908 ink with flat cast Norland Products optical adhesive NOA81.

FIGS. 17 and 19 illustrate plots 1700, 1900 of surface roughness of a single pass of Teikoku IRK-HF40908 ink with flat cast Norland optical adhesive NOA81. These values were obtained using the same experimental setup used in connection with the plots 1600, 1800 shown in FIGS. 16 and 18. Based on the plots 1700, 1900, flat casting Norland optical adhesive NOA81 to the single pass of Teikoku IRK-HF40908 ink improves the surface roughness ($R_a$) to 0.278 μm. This is an improvement of nearly a factor of 2× reduction in $R_a$, or a difference roughness of 0.2284 μm.

Figure 20:
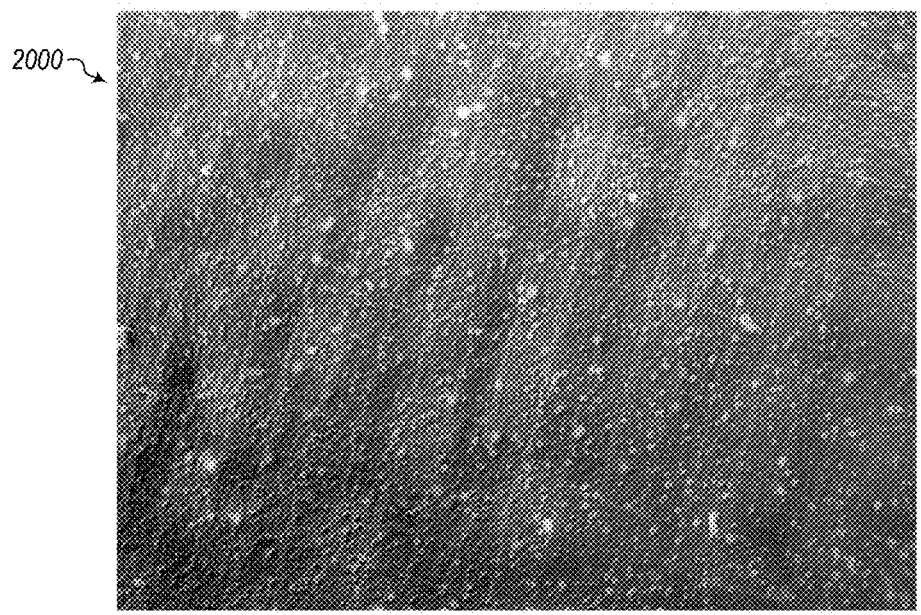
FIG. 20 illustrates a plot of surface roughness of two passes of Teikoku IRK-HF40908 ink.
Figure 22:
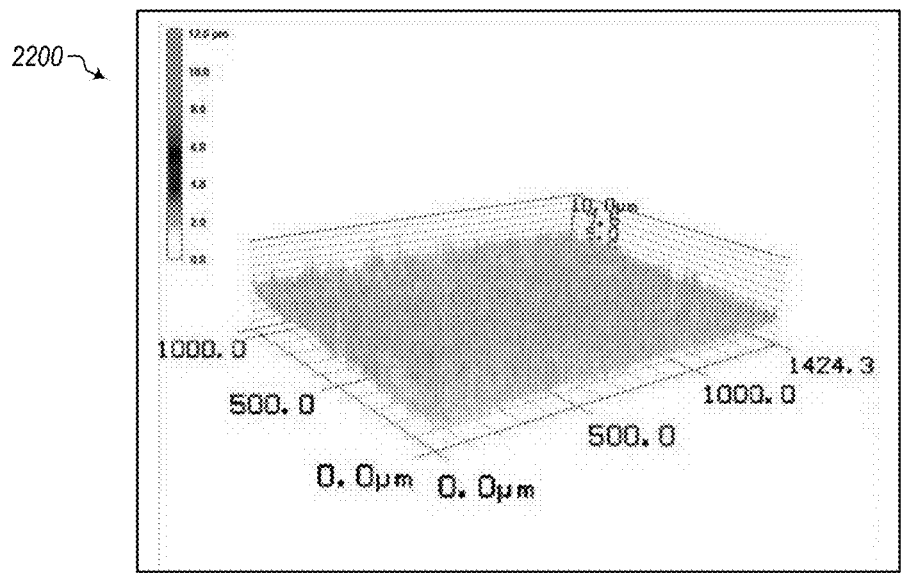
FIG. 22 illustrates another plot of surface roughness of two passes of Teikoku IRK-HF40908 ink.

FIGS. 20 and 22 illustrate plots 2000, 2200 of surface roughness of two passes of Teikoku IRK-HF40908 ink. These values were obtained using the same experimental setup used in connection with the plots 1600, 1700, 1800, 1900 shown in FIGS. 16-19. Based on the plots 2000, 2200, the two passes of Teikoku IRK-HF40908 ink has a surface roughness ($R_a$) of 0.6028 μm. Thus, two passes appears to increase the roughness of the surface (e.g., by nearly 0.1 μm). Further, the average density of scatter centers may increase, further increasing scatter.

Figure 21:
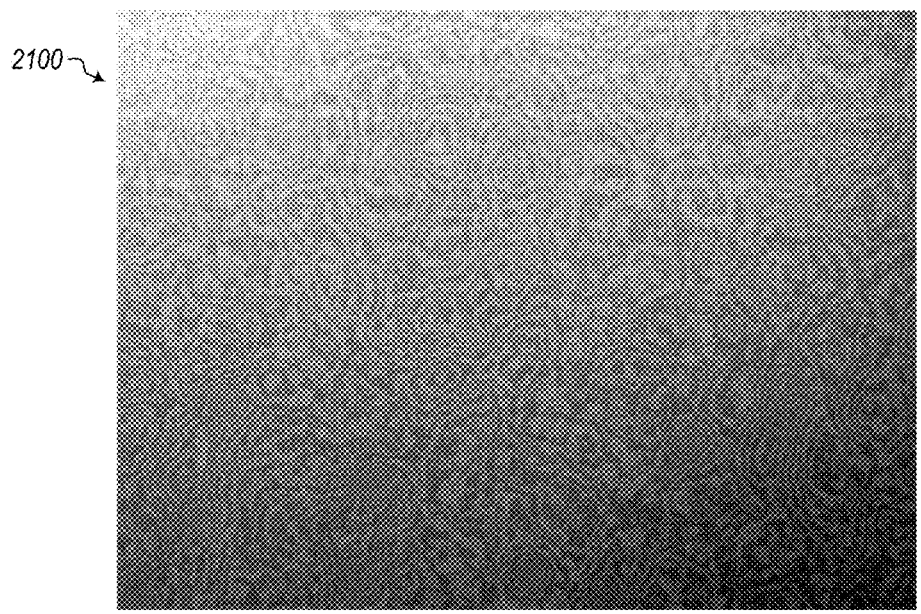
FIG. 21 illustrates a plot of surface roughness of two passes of Teikoku IRK-HF40908 ink with flat cast Norland Products optical adhesive NOA81.
Figure 23:
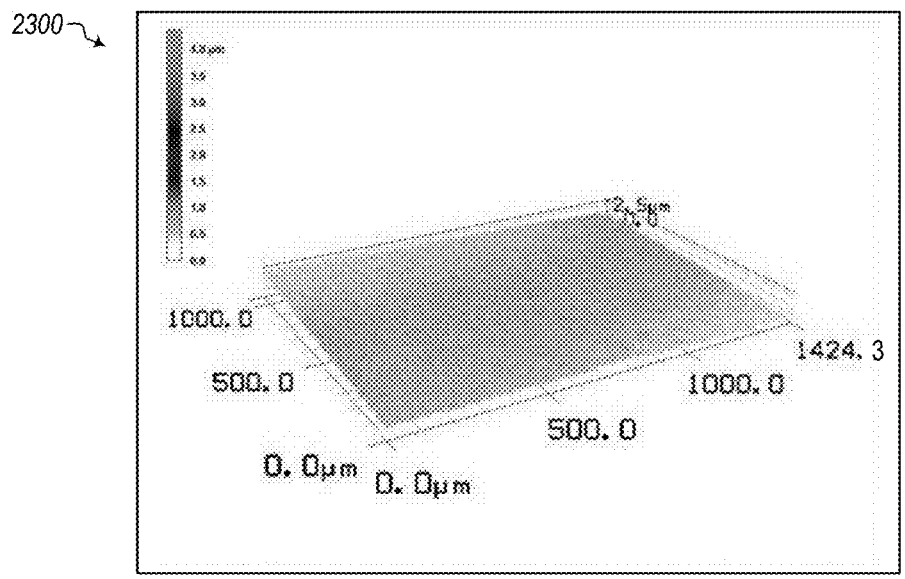
FIG. 23 illustrates another plot of surface roughness of two passes of Teikoku IRK-HF40908 ink with flat cast Norland Products optical adhesive NOA81.

FIGS. 21 and 23 illustrate plots 2100, 2300 of surface roughness of two passes of Teikoku IRK-HF40908 ink with flat cast Norland optical adhesive NOA81. These values were obtained using the same experimental setup used in connection with the plots 1600, 1700, 1800, 1900, 2000, 2200 shown in FIGS. 16-20 and 22. Based on the plots 2100, 2300, flat casting Norland optical adhesive NOA81 to two passes of Teikoku IRK-HF40908 ink improves the surface roughness ($R_a$) to 0.1989 μm. This is an improvement of 0.4039 μm.

Figure 24:
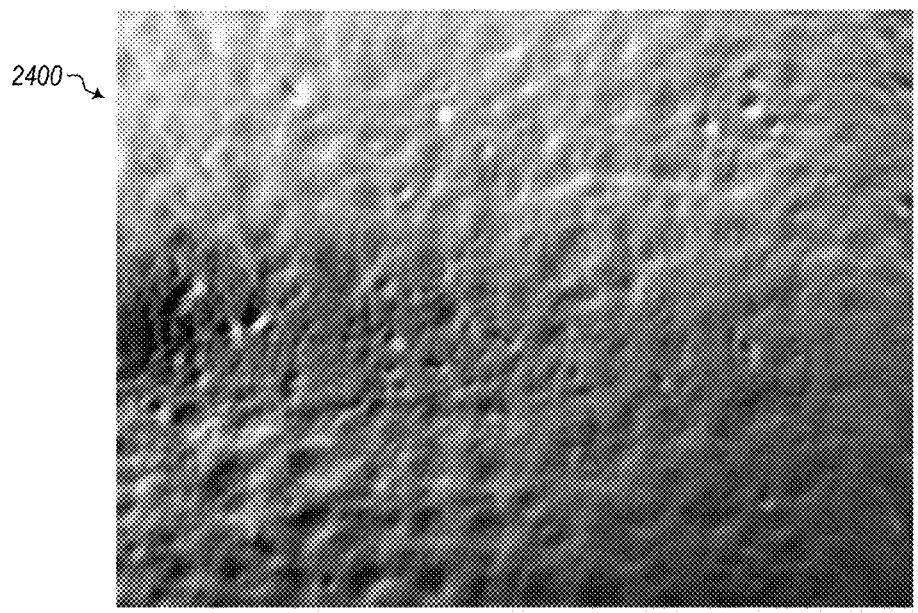
FIG. 24 illustrates a plot of surface roughness of another IR-T/Vis-Block ink.
Figure 26:
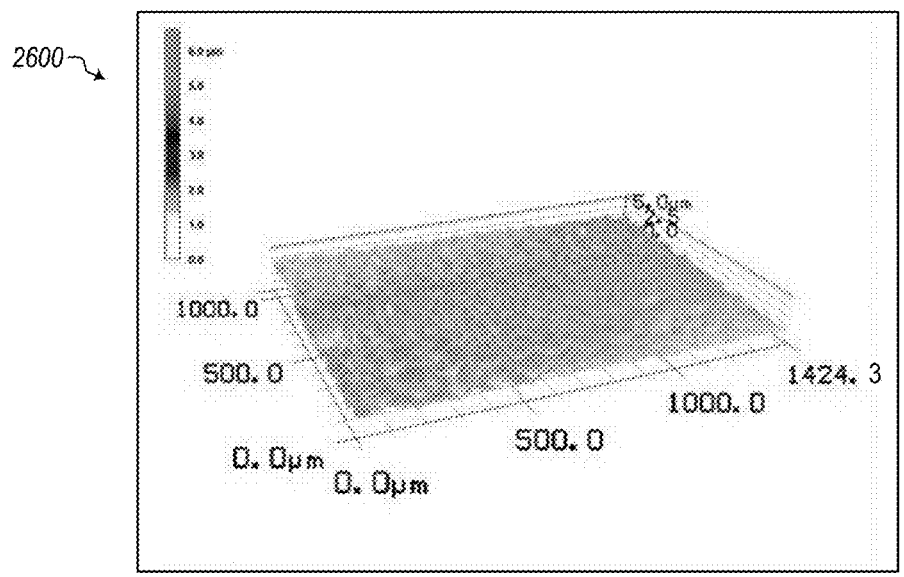
FIG. 26 illustrates another plot of surface roughness of another IR-T/Vis-Block ink.

FIGS. 24 and 26 illustrate plots 2400, 2600 of surface roughness of a single pass of Canesta ink. These values were obtained using the same experimental setup used in connection with the plots 1600, 1700, 1800, 1900, 2000, 2100, 2200, 2300 shown in FIGS. 16-23. Based on the plots 2400, 2600, the Canesta ink has a surface roughness ($R_a$) of 0.2586 μm.

Figure 25:
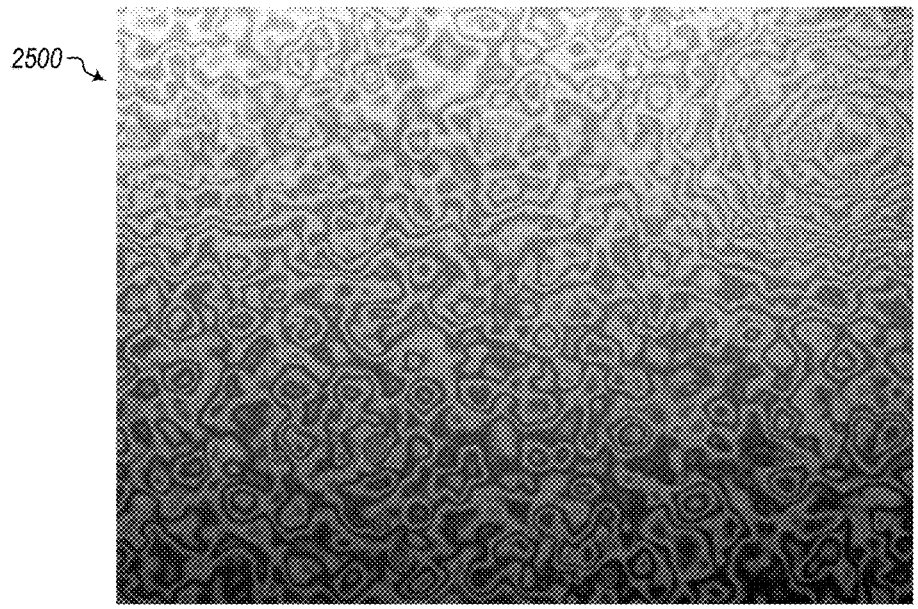
FIG. 25 illustrates a plot of surface roughness of another IR-T/Vis-Block ink with flat cast Norland Products optical adhesive NOA81.
Figure 27:
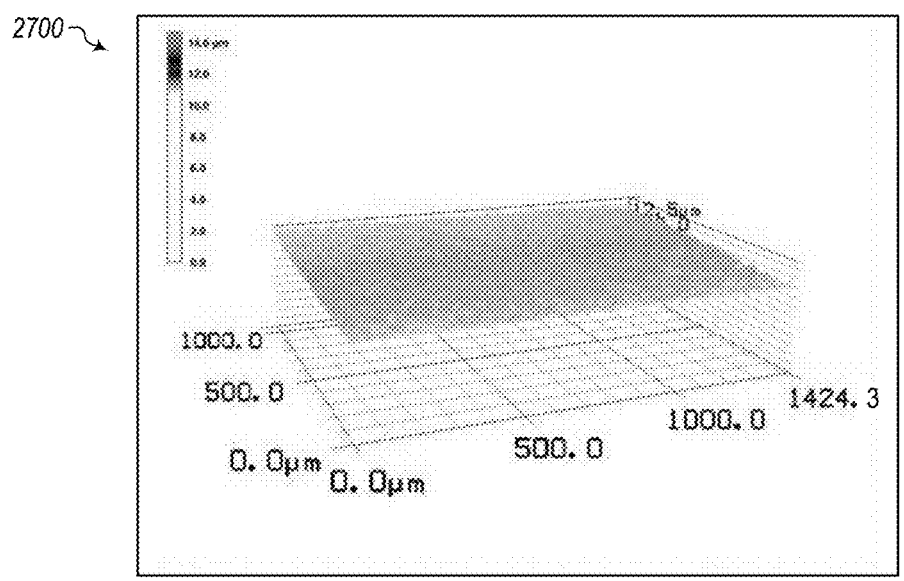
FIG. 27 illustrates another plot of surface roughness of another IR-T/Vis-Block ink with flat cast Norland Products optical adhesive NOA81.

FIGS. 25 and 27 illustrate plots 2500, 2700 of surface roughness of a single pass of Teikoku IRK-HF40908 ink with flat cast Norland optical adhesive NOA81. These values were obtained using the same experimental setup used in connection with the plots 1600, 1700, 1800, 1900, 2000, 2100, 2200, 2300, 2400, 2600 shown in FIGS. 16-24 and 26. Based on the plots 2500, 2700, flat casting Norland optical adhesive NOA81 to the single pass of Teikoku IRK-HF40908 ink improves the surface roughness ($R_a$) to 0.2410 μm. This is an improvement of 0.0176 μm.

FIGS. 28 and 29 illustrate plots 2800, 2900 of surface roughness of a CLAREX® NIR75 filter. These values were obtained using a Keyence scanning confocal microscope model VK-X200. Based on the plots 2800, 2900, the CLAREX® NIR75 filter has a surface roughness ($R_a$) of 0.0605 μm.

The preceding discussion refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

These described embodiments herein are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Elements of various embodiments of the present disclosure are introduced above. Use of the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. It should be understood that any directions or reference frames in the preceding description are merely relative directions or movements. For example, any references to "front" and "back," "inner" and "outer," and "innermost" and "outermost" are merely descriptive of the relative position or location of the related elements.

Where doing so would not conflict with a description of a Figure herein, any act, component, information, or other element described herein may replace or be combined with other act, component, information, or other element described in conjunction with a description of any other Figure described herein. Thus, the descriptions any Figures herein is hereby incorporated by reference into the description of any other Figure herein. For example, any infrared filter 420, 520, 620, 720, 820, 920, 1020, 1120 described in connection with FIGS. 4-11 may be incorporated into any cover glass 101, 201, 301 described in connection with FIGS. 1-3. Such that, unless expressly indicated otherwise, any act, component, information, or other element described herein may be claimed in conjunction with any other act, component, information, or other element described herein and such potential combination is hereby explicitly supported by this incorporation.

Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An infrared filter, comprising:
    a substrate having a front surface and a back surface;
    screened ink having a front surface nearest the substrate and a back surface; and an optically clear medium abutting at least a portion of the back surface of the screened ink, wherein the infrared filter does not impact modulation transfer function (MTF) more than 7% loss in modulation at a predetermined spatial frequency of interest.

2. The infrared filter of claim 1, wherein the substrate is glass attached to one of a mobile device, a monitor, and a wearable device.

3. The infrared filter of claim 1, further comprising an inner substrate having a front surface abutting a back surface of the optically clear medium.

4. The infrared filter of claim 3, wherein the inner substrate has a surface roughness of less than 0.1 µm.

5. The infrared filter of claim 3, wherein the inner substrate has a surface roughness of less than 0.24 µm.

6. The infrared filter of claim 1, wherein a maximum thickness measured through the infrared filter from an outermost surface of the infrared filter to an innermost surface of the infrared filter is less than 220 µm.

7. The infrared filter of claim 1, wherein the screened ink blocks at least 95% of visible light that contacts an outermost surface of the infrared filter and transmits at least 70% of infrared light that contacts the outermost surface of the infrared filter, wherein the visible light includes a wavelength of light between 400 nm and 700 nm, and wherein the infrared light includes a wavelength of light between 700 nm to 1000 nm.

8. The infrared filter of claim 1, wherein the predetermined amount of difference between the first index of refraction of the screened ink and the second index of refraction of the optically clear medium is less than 0.02.

9. The infrared filter of claim 1, wherein the visible light mask defines an aperture on the back surface of the substrate such that the visible light mask abuts the substrate around an entirety of the aperture and the screened ink abuts the back surface of the substrate within at least a portion of the aperture on the back surface of the substrate.

10. An infrared filter, comprising:
a substrate having a front surface and a back surface;
screened ink having a front surface nearest the substrate and a back surface;
an optically clear medium abutting at least a portion of the back surface of the screened ink; and
a visible light mask applied to the back surface of the substrate and between at least a portion of the front surface of the screened ink and the back surface of the substrate.

11. The infrared filter of claim 10, wherein the screened ink blocks at least 95% of visible light that contacts an outermost surface of the infrared filter and transmits at least 70% of infrared light that contacts the outermost surface of the infrared filter, wherein the visible light includes a wavelength of light between 400 nm and 700 nm, and wherein the infrared light includes a wavelength of light between 700 nm to 1000 nm.

12. The infrared filter of claim 11, wherein the screened ink blocks more than 99% of the visible light that contacts the outermost surface of the infrared filter and transmits at least 80% of the infrared light that contacts the outermost surface of the infrared filter.

13. The infrared filter of claim 11, wherein the screened ink blocks more than 99% of the visible light that contacts the outermost surface of the infrared filter and transmits at least 80% of the infrared light that contacts the outermost surface of the infrared filter.

14. The infrared filter of claim 10, wherein the infrared filter does not impact MTF more than 5% loss in modulation at a predetermined spatial frequency of interest.

15. The infrared filter of claim 10, wherein the predetermined amount of difference between the first index of refraction of the screened ink and the second index of refraction of the optically clear medium is less than 0.02.

16. The infrared filter of claim 10, wherein the visible light mask defines an aperture on the back surface of the substrate such that the visible light mask abuts the substrate around an entirety of the aperture and the screened ink abuts the back surface of the substrate within at least a portion of the aperture on the back surface of the substrate.

17. The infrared filter of claim 10, wherein the visible light mask defines an aperture on the back surface of the substrate such that the visible light mask abuts the substrate around an entirety of the aperture and the screened ink abuts the back surface of the substrate within at least a portion of the aperture on the back surface of the substrate.

18. The infrared filter of claim 10, wherein the infrared filter does not impact MTF more than 7% loss in modulation at a predetermined spatial frequency of interest.

19. The infrared filter of claim 10, further comprising an inner substrate having a front surface abutting a back surface of the optically clear medium.

20. A method of manufacturing an infrared filter, comprising:
applying a screened ink to a back surface of a substrate;
applying an optically clear medium to a back surface of the screened ink;
applying a mold to a back surface of the optically clear medium;
curing the optically clear medium to form an infrared filter; and
removing the mold from the back surface of the optically clear medium of the infrared filter,
wherein the infrared filter does not impact modulation transfer function (MTF) more than 7% loss in modulation at a predetermined spatial frequency of interest.

* * * * *